US012782790B2

(12) United States Patent
Ofir

(10) Patent No.: US 12,782,790 B2
(45) Date of Patent: Nov. 3, 2026

(54) REFRACTIVE INDEX MODULATION IN DIFFRACTIVE GRATINGS FOR OPTICAL ELEMENTS OF AUGMENTED REALITY AND VIRTUAL REALITY DISPLAYS

(71) Applicant: Adeia Guides Inc., San Jose, CA (US)

(72) Inventor: Yuval Ofir, Kfar Ha-Oranim (IL)

(73) Assignee: Adeia Guides Inc., San Jose, CA (US)

( * ) Notice: Subject to any disclaimer, the term of this patent is extended or adjusted under 35 U.S.C. 154(b) by 445 days.

(21) Appl. No.: 18/121,045

(22) Filed: Mar. 14, 2023

(65) Prior Publication Data

US 2024/0310692 A1 Sep. 19, 2024

(51) Int. Cl.
*G02F 1/295* (2006.01)
*F21V 8/00* (2006.01)

(52) U.S. Cl.
CPC ......... *G02F 1/2955* (2013.01); *G02B 6/0016* (2013.01); *G02B 6/0036* (2013.01)

(58) Field of Classification Search
CPC .... G02B 6/0036; G02B 6/0016; G02F 1/2955
See application file for complete search history.

(56) References Cited

U.S. PATENT DOCUMENTS 10,635,007 B1 4/2020 Yang et al.
12,416,755 B2 9/2025 Ofir
2006/0078257 A1* 4/2006 Park ....................... G02B 6/138 385/24
2017/0047484 A1* 2/2017 Kuo ..................... H10H 20/833
2022/0152724 A1 5/2022 Luo et al.
2022/0229396 A1 7/2022 Leibovici et al.
2022/0244615 A1* 8/2022 Kang .................... G02F 1/2955
2023/0176378 A1* 6/2023 Amirsolaimani .. G02B 27/0093 359/630
2023/0400748 A1* 12/2023 Valentine ................ G02F 1/395
2024/0310567 A1 9/2024 Ofir
2025/0035930 A1* 1/2025 Lajunen ................. B60K 35/23

OTHER PUBLICATIONS

U.S. Appl. No. 18/121,043, filed Mar. 14, 2023, Yuval Ofir.
Kress et al., "Holographic optics in planar optical systems for next generation small form factor mixed reality headsets," Light: Advanced Manufacturing (2022)3:42 https://doi.org/10.37188/lam.2022.042, Official Journal of the JHL 2689-9620.
U.S. Appl. No. 19/300,919, filed Aug. 15, 2025, Yuval Ofir.

* cited by examiner

*Primary Examiner* — Thomas A Hollweg
*Assistant Examiner* — Marc E Manheim
(74) *Attorney, Agent, or Firm* — HG LAW LLP

(57) ABSTRACT

Head-mounted displays (HMD) or other suitable optical equipment with waveguides comprising an optical element comprising a diffractive grating. The optical element may comprise a plurality of microheaters corresponding to respective portions of the diffractive grating, wherein a plurality of voltages is applied to the plurality of microheaters to selectively modulate respective refractive indexes of corresponding portions of the diffractive grating.

20 Claims, 18 Drawing Sheets

202 Pattern transparent conductive material onto substrate

REFRACTIVE INDEX MODULATION IN DIFFRACTIVE GRATINGS FOR OPTICAL ELEMENTS OF AUGMENTED REALITY AND VIRTUAL REALITY DISPLAYS

BACKGROUND

This disclosure is generally directed to optical elements. In particular, the present disclosure relates to diffractive gratings for use in optical equipment (e.g., for optical devices in augmented and virtual reality displays).

SUMMARY

Virtual reality (VR) and augmented reality (AR) systems are becoming increasingly common in the modern world. A large focus of modern optical and electrooptical technologies is to create head-mounted displays (HMDs) or near-eye displays (NEDs) that create virtual images in a field-of-view of one or both eyes of a user.

AR and VR displays face several common challenges to satisfy the demanding human vision requirements, such as field of view (FOV), eye motion box (EMB), transmittance, angular resolution, dynamic range, form factor, brightness, contrast, correct depth cue and/or other properties. These requirements often exhibit tradeoffs with one another, and while efforts have been made to improve the various limitations associated with the various optical architectures, VR and AR displays are generally limited in one way or another.

In some approaches, HMDs include waveguides made from glass or plastic, which diffract or reflect light from an image source to an eye of the user. The waveguides may be implemented in lenses of glasses that are attached to the image source. In the case of diffractive waveguides, waveguides include diffractive gratings, such as an input coupler (in-coupling) grating and an output coupler (out-coupling) grating. Light propagating inside the waveguide follows Total Internal Reflection (TIR), and the TIR angle is governed by the refractive index of the waveguide. In current approaches, there are many design complexities associated with providing a wider FOV and a higher refractive index. To create more uniform display, it may be desirable to increase a refractive index of a waveguide generally along a length of the waveguide, in part due to light exiting the waveguide as it propagates therethrough.

To help overcome such deficiencies, the present disclosure provides various techniques that help to optimize the efficiency of diffractive gratings in the waveguide, e.g., along a length and/or depth of a diffractive grating progressing further into the waveguide, which may be desirable due to less light being in the waveguide as portions of light may be diffracted and transmitted out along the waveguide.

For example, the present disclosure provides for optical equipment (e.g., HMDs, near-eye displays or other suitable optical equipment) with optical elements including one or more microheaters and/or various portions of differing ratios of one or more materials of different refractive indexes, and methods for fabricating said waveguides are described herein. In some embodiments of this disclosure, the optical elements described herein correspond to a waveguide or comprise a waveguide. In some embodiments, a display, such as, for example, an HMD or other optical equipment, may comprise the optical element and an image source that provides an image beam to the optical element. The optical element may comprise a diffractive grating and a plurality of microheaters corresponding to respective portions of the diffractive grating, wherein a plurality of voltages is applied to the plurality of microheaters to selectively modulate respective refractive indexes of corresponding portions of the diffractive grating. The optical element may be configured to convert the image beam into an output image by diffracting the image beam through the diffractive grating, propagating the image beam through the optical element, and directing the image beam through a surface of the optical element.

In some embodiments of this disclosure, the diffractive grating may be used as one or more of an in-coupling grating, an out-coupling grating, an expansion grating, or any other diffractive grating used in conjunction with a display, such as, for example, an HMD or other suitable optical equipment.

In some embodiments, at least one of the microheaters of the plurality of microheaters is distinct from a respective portion of the diffractive grating. In some embodiments, the diffractive grating comprises at least one of the microheaters.

In some embodiments, a plurality of voltage sources may be provided, each of the plurality of voltages sources being electrically coupled to a respective microheater of the plurality of microheaters and configured to apply a respective voltage of the plurality of voltages to the corresponding microheater. In some embodiments, the portions of the diffractive grating respectively correspond to a plurality of positions along a length of the optical element, and/or correspond to a plurality of depths in the optical element.

In some embodiments, the portions of the diffractive grating comprise a first portion and a second portion; a first voltage of the plurality of voltages is configured to be applied to a first microheater of the plurality of microheaters corresponding to the first portion; a second voltage of the plurality of voltages is configured to be applied to a second microheater of the plurality of microheaters, wherein the second voltage exceeds the first voltage. The optical element may be configured to selectively modulate the respective refractive indexes of corresponding portions of the diffractive grating by causing, based on applying the first voltage and the second voltage, a temperature of the second portion to be higher than a temperature of the first portion. The diffractive grating may comprise two or more of an incoupling grating, an outcoupling grating, or an expansion grating, and each of the first portion and the second portion may be included in the outcoupling grating.

In some embodiments, the diffractive grating is a surface relief grating or a buried diffractive grating, and/or the optical element further comprises a surface relief grating and a buried diffractive grating.

In some embodiments, each of the plurality of microheaters comprise a transparent conductive material. In some embodiments, the transparent conductive material comprises indium tin oxide.

In some embodiments, the portions of the diffractive grating respectively correspond to a plurality of positions along a length of the optical element. In some embodiments, the optical element may be configured to selectively modulate respective refractive indexes of corresponding portions of the diffractive grating based at least in part on user preferences (e.g., a particular display preference that corresponds to a certain refractive index(es) at one or more portions of the diffractive grating) or current environment conditions (e.g., lighting conditions, temperature, or any other suitable condition).

In some embodiments, the optical element is configured to convert the image beam into the output image by: receiving the image beam at an incoupling grating of the optical element which diffracts the image beam towards an expansion grating of the optical element; expanding the image beam by the expansion grating of the optical element and transmitting the beam from the expansion grating to an outcoupling grating; and diffracting the expanded image beam by the outcoupling grating towards an eyeball of a wearer of the head-mounted display.

In some embodiments of the present disclosure, a method is provided comprising directing an image beam into an optical element, the optical element comprising a diffractive grating, and selectively modulating refractive indexes along the diffractive grating by: applying a first voltage to a first microheater, which is coupled to a first portion of the diffractive grating; and applying a second voltage to a second microheater, which is coupled to a second portion of the diffractive grating. The image beam may be converted into an output image by diffracting the image beam through the diffractive grating while selectively modulating the refractive indexes along the diffractive grating, and directing the image beam through a surface of the optical element.

In some embodiments, the first microheater is distinct from the first portion of the diffractive grating and/or the second microheater is distinct from the second portion of the diffractive grating. In some embodiments, the second voltage exceeds the first voltage, and selectively modulating refractive indexes along the diffractive grating further comprises causing, based on applying the first voltage and the second voltage, a temperature of the second portion to be higher than a temperature of the first portion.

In some embodiments, the diffractive grating comprises a plurality of zones, the plurality of zones including a first zone, a second zone and a third zone, wherein substantially all of a plurality of structures that define the diffractive grating in the first zone comprise a first material, substantially all of a plurality of structures that define the diffractive grating in the third zone comprise a second material, a plurality of structures that define the diffractive grating in the second zone comprise each of the first material and the second material, and a refractive index of the second material is higher than a refractive index of the first material.

In some embodiments, each of the first zone, the second zone and the third zone comprise a respective plurality of distinct diffractive grating structures. In some embodiments, the second zone comprises a plurality of distinct diffractive grating structures, each diffractive grating structure of the plurality of diffractive grating structures being substantially of the first material or substantially of the second material. The diffractive grating may be used as one or more of an in-coupling grating, an out-coupling grating, an expansion grating, or any other diffractive grating used in conjunction with a display, such as, for example, an HMD or other suitable optical equipment.

In some embodiments, the optical element further includes an incoupling grating at a first location along a length of the optical element, the first zone is closer to the incoupling grating along the length of the optical element than the second zone and the third zone, and the second zone is closer to the incoupling grating along the length of the optical element than the third zone.

In some embodiments, the first zone, the second zone, and the third zone respectively correspond to a plurality of depths in the optical element. In some embodiments, a fourth zone is provided, between the second zone and the third zone along the length of the optical element, a plurality of structures that define the diffractive grating in the fourth zone comprising the first material and the second material, a ratio of the second material to the first material in the plurality of structures that define the diffractive grating in the fourth zone being higher than a ratio of the second material to the first material in the plurality of structures that define the diffractive grating in the second zone.

In some embodiments, the diffractive grating comprises a plurality of zones, the plurality of zones including a first zone, a second zone and a third zone, wherein a plurality of structures that define the diffractive grating in the first zone comprise a first material, a second material and a third material; a plurality of structures that define the diffractive grating in the second zone comprise the first material, the second material and the third material; and wherein substantially all of a plurality of structures that define the diffractive grating in the third zone comprise the third material.

In some embodiments, the plurality of structures that define the diffractive grating in the second zone comprise more of the second material than the third material, and a ratio of the first material to the second material and the third material in the plurality of structures that define the diffractive grating in the first zone exceeds a ratio of the first material to the second material and the third material in the plurality of structures that define the diffractive grating in the third zone.

In some embodiments, the optical element further includes an incoupling grating at a first location along a length of the optical element; and the first zone is closer to the incoupling grating along the length of the optical element than the second zone and the third zone, and the second zone is closer to the incoupling grating along the length of the optical element than the third zone.

The present disclosure contemplates optical elements that incorporate various combinations of these, and other embodiments or aspects disclosed herein.

In some embodiments, a method for producing a waveguide for an HMD is provided, comprising fabricating an optical element with a diffractive grating comprising a plurality of microheaters corresponding to respective portions of the diffractive grating.

In some embodiments, a waveguide, produced by fabricating an optical element with a diffractive grating comprising a plurality of microheaters corresponding to respective portions of the diffractive grating, is provided.

The diffractive grating may be a surface relief grating and/or an outcoupling grating. The plurality of microheaters may be embedded in the diffractive grating.

In some embodiments, a method for producing a waveguide for an HMD is provided, comprising fabricating an optical element comprising a diffractive grating having a plurality of zones, the plurality of zones including a first zone, a second zone and a third zone. A plurality of structures that define the diffractive grating in the first zone may comprise a first material, a second material and a third material; a plurality of structures that define the diffractive grating in the second zone may comprise the second material and the third material, and wherein substantially all a plurality of structures that define the diffractive grating in the third zone may comprise the third material.

In some embodiments, a waveguide produced by fabricating an optical element is provided comprising a diffractive grating having a plurality of zones. Such plurality of zones may include a first zone, a second zone and a third zone, wherein substantially all of a plurality of structures that define the diffractive grating in the first zone comprise a first material; substantially all of a plurality of structures that define the diffractive grating in the third zone comprise a second material; and a plurality of structures that define the diffractive grating in the second zone comprise each of the first material and the second material.

In some embodiments, a method for producing a waveguide for a head-mounted display is provided, comprising fabricating an optical element with a diffractive grating having a plurality of zones, the plurality of zones including a first zone, a second zone and a third zone. Substantially all of a plurality of structures that define the diffractive grating in the first zone comprise a first material, substantially all of a plurality of structures that define the diffractive grating in the third zone comprise a second material, and a plurality of structures that define the diffractive grating in the second zone comprise each of the first material and the second material.

In some embodiments, a waveguide is provided that is produced by fabricating an optical element comprising a diffractive grating having a plurality of zones, the plurality of zones including a first zone, a second zone and a third zone, wherein the first zone comprises a first material, a second material and a third material. A plurality of structures that define the diffractive grating in the second zone may comprise the second material and the third material, and wherein substantially all of a plurality of structures that define the diffractive grating in the third zone comprise the third material.

In some embodiments, a method of producing the diffractive grating comprises patterning a sacrificial material on a surface of a transparent material, such as glass or plastic. The sacrificial material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide. In some embodiments, the coating may comprise conductive material to be used as part of the plurality of microheaters. In some embodiments, the coating may comprise one or more materials, where one or more portions of the coating may be used to form the first zone, second zone, third zone and/or fourth zone. In some embodiments, such techniques may be employed to produce a buried or superimposed diffractive grating. The sacrificial material may then be removed through a process of sintering or dissolution to form non-solid pockets within the optical waveguide.

Another method of producing the diffractive grating comprises patterning a low-index material, such as lithium fluoride, calcium fluoride, magnesium fluoride, or any other low refractive index optical resin, on a surface of a transparent material, such as glass or plastic. The low-index material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide or a relevant high refractive index resin. In some embodiments, the coating may comprise conductive material to be used as part of the plurality of microheaters. In some embodiments, the coating may comprise one or more materials, where one or more portions of the coating may be used to form the respective plurality of structures that define the diffractive grating in the first zone, second zone, third zone and/or fourth zone. In some embodiments, such techniques may be employed to produce a buried or superimposed diffractive grating.

Another method of producing the diffractive grating comprises fabricating a grating onto a transparent material, such as through various lithographic techniques. A flat piece of transparent material of a desired thickness is then bonded to the top of the grating, such as through glass laser bonding. An additional processing step may include thinning the flat piece of glass to the desired thickness.

In some embodiments, one or more of a surface relief grating or the buried diffractive grating may be fabricated using a transparent conductive material. The transparent conductive material comprises a material designed to absorb certain polarization light while also comprising a refractive index high enough that it can be used to diffract light. Examples of transparent conduct materials include transparent conductive oxides, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or conductive polymers, such as poly(3,4-ethylenedioxythiphene) (PEDOT) or poly (3,4-ethylenedioxythiophene): poly(styrene sulfonate) (PEDOT:PSS). In some embodiments, the transparent conductive material is used to create an in-coupling grating to reduce incoming stray light from the image source by absorbing unwanted polarizations. In some embodiments, the transparent conductive material is used to create an out-coupling grating to reduce stray light from external sources and/or to reduce the stray light diffracted to an eye of the user through the out-coupling grating, by absorbing unwanted polarizations. Other embodiments may use diffractive gratings such as any of the diffractive gratings of the waveguide and/or multiple diffractive gratings of the waveguide.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
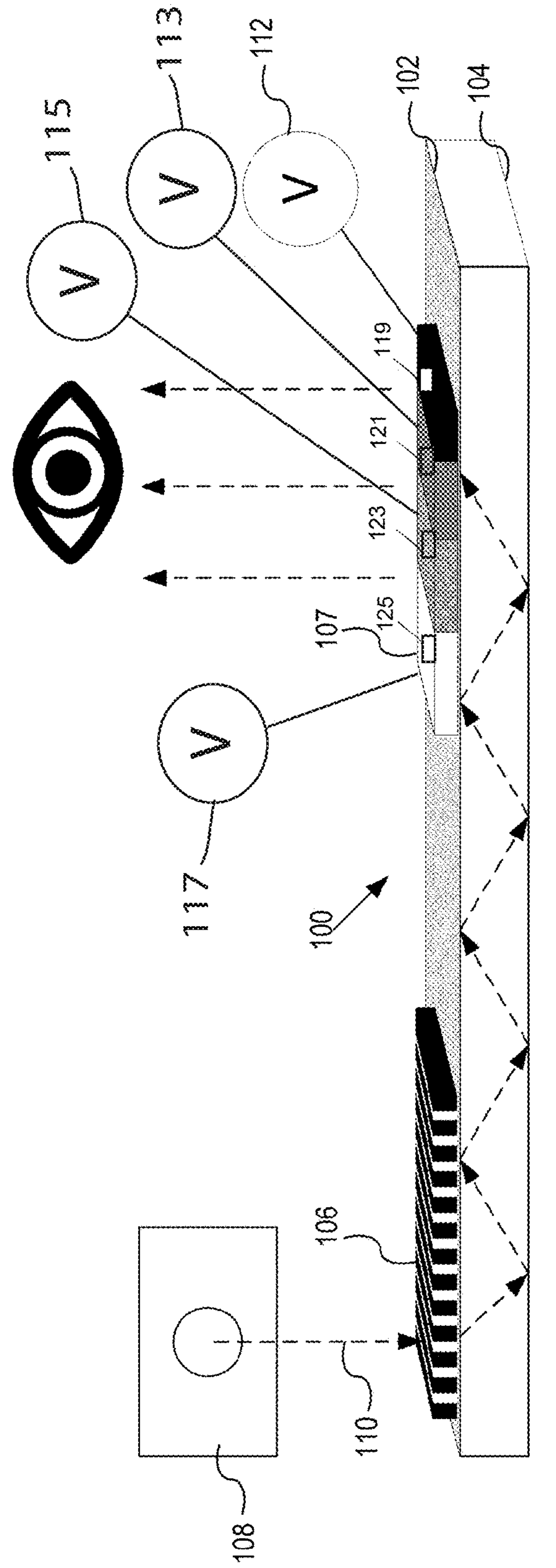
FIG. 1A depicts a diagram of an optical element of an HMD, or other suitable optical equipment, wherein the optical element may comprise or correspond to a waveguide with one or more diffractive gratings.

FIG. 1A depicts a diagram of an optical element of a head-mounted display (HMD) or other optical equipment. In some embodiments, the optical element may comprise or correspond to a waveguide with one or more diffractive gratings. In some embodiments, optical element 100 may comprise flat surface 102 that is substantially parallel to an opposing flat surface 104. Flat surfaces 102 and 104 may comprise a same material, such as glass or plastic, or different materials with substantially equal refractive indices. As used herein, a first refractive index is substantially equal to a second refractive index if the refractive indices differ by less than about 0.01. In some embodiments, the substantially equal refractive indices differ by less than about 0.001. In some embodiments, the substantially equal refractive indices differ by less than about 0.0001. In some embodiments, the first material at flat surface 102 is a glass or plastic, and the second material at flat surface 104 is a coating that has a refractive index that is substantially equal to the refractive index of the first material.

Optical element 100 may comprise diffractive grating 106 and diffractive grating 107. In some embodiments, each of diffractive grating 106 and diffractive grating 107 may be a surface relief grating, and each of diffractive grating 106 and diffractive grating 107 may be on top of flat surface 102. In some embodiments, at least one of diffractive grating 106 and diffractive grating 107 may be a buried diffractive grating between flat surface 102 and flat surface 104, such that the buried diffractive grating is spaced from flat surface 102 and flat surface 104. In some embodiments, diffractive grating 106 may be configured as an in-coupling grating, and diffractive grating 107 may be configured as an out-coupling grating. While FIG. 1A depicts both the in-coupling grating and out-coupling grating as surface relief gratings, embodiments may include an optical element that comprises a surface relief grating (or any other suitable type of grating) as an in-coupling grating, out-coupling grating, expansion grating, or any combination thereof. Methods for creating diffractive grating 106 and diffractive grating 107 are described further herein. Any suitable number of diffractive gratings may be distributed along a length of, and/or at various depths within, the waveguide.

In some embodiments, second surface relief grating 107 may be fabricated from a same material as first surface relief grating 106, or second surface relief grating 107 may be fabricated from a different material than the first surface relief grating 106. For instance, the first surface relief grating may be fabricated using laser etching of glass while the second surface relief grating may be fabricated from a transparent conductive material. Other embodiments may include an optical element that comprises a transparent conductive material in the in-coupling grating, out-coupling grating, expansion grating, or any combination thereof.

In some embodiments, diffractive grating 106 and/or diffractive grating 107 may each comprise a plurality of pockets of low refractive index material interspaced with high refractive index material. The low refractive index material may include solid materials with relatively low refractive indices, such as lithium fluoride, calcium fluoride, magnesium fluoride, or optical resins, or nonsolid pockets, such as pockets of air, vacuum, or gas. The high refractive index material comprises a material that has a refractive index substantially equal to the refractive index of the material of the first surface and/or the second surface. In some embodiments, the high refractive index material is a same material as the first surface and/or second surface, such as glass or plastic. In other embodiments, the high refractive index material is a different material than one or more of the surfaces, such as a coating material. The coating material may comprise any of cubic zirconium oxide, titanium oxide, aluminum oxide, diamond, hafnium oxide, tantalum oxide, zinc oxide, or other high-index resins.

In some embodiments, the high refractive index material of the diffractive grating comprises a transparent conductive material. The transparent conductive material may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, zinc tin oxide, or zinc oxide, or a conductive polymer, such as poly(3,4-ethylenedioxythiphene) (PEDOT) or poly(3,4-ethylenedioxythiophene): poly (styrene sulfonate) (PEDOT:PSS). In some embodiments, the surface relief grating is fabricated using a transparent conductive material. In some embodiments, both the surface relief grating and the buried diffractive grating are manufactured using a transparent conductive material.

In some embodiments, diffractive grating 107 may comprise transparent conductive material, or any other suitable conductive material, and diffractive grating 107 may comprise and/or be coupled to an active index modulation mechanism. Additionally or alternatively, the transparent conductive material and/or active index modulation mechanism may be distinct from diffractive grating 107, e.g., located at another portion of optical element 100. In some embodiments, the transparent conductive material included in (or distinct from) second diffractive grating 107 may be coupled to voltage source 112, and may comprise a wire or coil or other conductive element, and may be configured to generate heat when an electric current flows through the conductive material. In some embodiments, one or more portions of the conductive material (each of which may be included in or distinct from diffractive grating 107) may comprise or be coupled to an electrical resistor to generate heat when the electrical current flows through the resistor. Voltage source 112 may be any suitable voltage source, such as, for example, a battery, a power supply, an integrated circuit, circuitry and/or other components connected to the electrical power grid, or any other suitable voltage source, or any combination thereof.

In some embodiments, voltage source 112 may correspond to one or more voltage sources, which may be configured to apply voltages to one or more microheaters. In some embodiments, a plurality of voltage sources 112, 113, 115, 117 may be provided, which may be configured to apply voltages to a plurality of microheaters 119, 121, 123, 125, respectively. In some embodiments, one or more of the voltage sources may be provided to apply a voltage to multiple microheaters. In some embodiments, one or more of the diffractive gratings may comprise or correspond to one or more of the microheaters. Additionally, or alternatively, one or more of the microheaters may be components that are distinct from one or more of the diffractive gratings.

The conductive material (included in or distinct from diffractive grating 107) may be connected to a variable voltage source 112, which may enable applying an electric current to one or more portions of second diffractive grating 107, thereby modulating the local refractive index (via the thermo-optic coefficient (TOC)) of such portion(s) and changing the temperature of such portion(s). Variable voltage source 112 may enable various portions or segments of diffractive grating 107 to function as microheaters, embedded in second diffractive grating 107, for respective portions of second diffractive grating 107. For example, using variable voltage source 112 to apply the electrical current to one or more portions of diffractive grating 107 may cause an induced change to the grating temperature of such portion(s), effectively changing the refractive index at a local position of one or more portions of diffractive grating 107, which causes a change in the in/out-coupling efficiency of the light from second diffractive grating 107. Such features may enable a gradual modulation of a refractive index along the length and/or depth of a diffractive grating, allowing for optimal performance of the waveguide. In some embodiments, the induced change in temperature may be a relatively small amount of degrees, e.g., 5 degrees or any other suitable number of degrees, and/or may depend on how much a refractive index of a portion is to be modified. In some embodiments, the induced change may occur quickly, e.g., a few milliseconds.

In some embodiments, diffractive grating 107 may correspond to a surface relief grating and may itself correspond to or otherwise include the plurality of microheaters. Additionally or alternatively, optical element 100 may include one or more microheaters at a portion of optical element 100 that is distinct from diffractive grating 107, e.g., at a different diffractive grating, and/or at other portions of optical element 100 that do not correspond to a diffractive grating. In some embodiments, one or more of the microheaters may be located at any suitable portion of an HMD or other display. In some embodiments, one or more of the microheaters may be a TCO-based microheater.

In some embodiments, diffractive grating 107 may be a TCO-based diffraction grating divided into segments or portions or sub-sections, each being connected to its own voltage source. The application of a voltage on the segment's conductive portion may heat up the segment due to the inherent resistivity, and the elevated temperature may cause a thermo-optic effect that is manifested in an increase of the refractive index. In some embodiments, the segmentation of the grating into small areas allows for a gradual increase in the local refractive index, creating a non-uniform gradual increase in the grating spectral and angular responses efficiency. In some embodiments, portions of diffractive grating 107 at which the microheater(s) is to be formed may be defined using any suitable lithographic technique(s).

In some embodiments, various types of grating structures (e.g., blazed, slanted, analog structures, varying depth structures, or any other suitable structures, or any combination thereof) may be connected to a voltage source and configured to operate as microheaters to modulate a gradual refractive index along a length and/or depth of the diffractive grating via localized micro-heating.

FIG. 1A depicts the diffractive grating as a uniform vertical structure with even spacing for the purpose of providing a clear example. FIG. 1-8 are provided as representations of the methods and systems described herein. The elements of FIG. 1-8 are not intended to provide to-scale examples of the methods and systems described herein and embodiments may include different orientations of elements, different sizing of elements, different spacing of elements, or other different configurations of elements. The methods described herein may be used to generate diffraction gratings in a variety of different shapes and structures, including blazed structures, slanted structures, binary structures, analogue structures, or varying depth structures. Additionally or alternatively, the diffractive gratings may utilize different types of spacings and/or may comprise buried diffractive gratings, as described further herein. In some embodiments, the low refractive index material and high refractive index material sections have different widths.

Image source 108, which provides an image beam to the optical element 100, may comprise a device configured to project image beam 110 comprising beams of light corresponding to a plurality of pixels or voxels that are to be displayed as an image. In the example of FIG. 1A, the image beam 110 is diffracted by in-coupling grating 106. A portion of the image beam may be transmitted out of the waveguide through a surface of the waveguide towards an eye of a user, and another portion of the diffracted image beam may be guided through the waveguide through total internal reflection across flat surface 102 and flat surface 104. The image beam is then diffracted by one or more out-coupling gratings (such as, for example, diffractive grating 107 of FIG. 1A and/or diffractive grating 109 of FIG. 1B) to be displayed to an eye of a user. In this manner, the optical element propagates the image beam through the waveguide and directs the image beam through a surface of the waveguide towards an eye of a user, thereby converting the image beam into an image for viewing by the user.

Figure 1B:
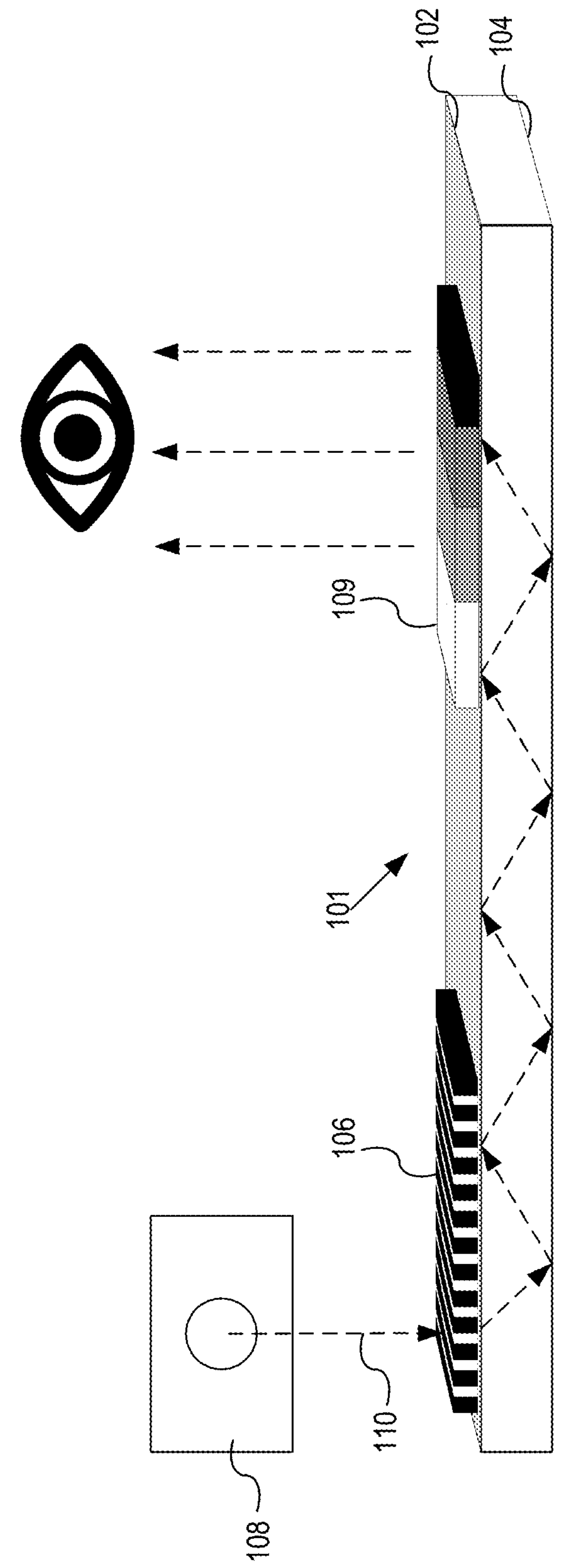
FIG. 1B depicts a diagram of an optical element of an HMD, or other suitable optical equipment, wherein the optical element may comprise or correspond to a waveguide with one or more diffractive gratings.
Figure 1C:
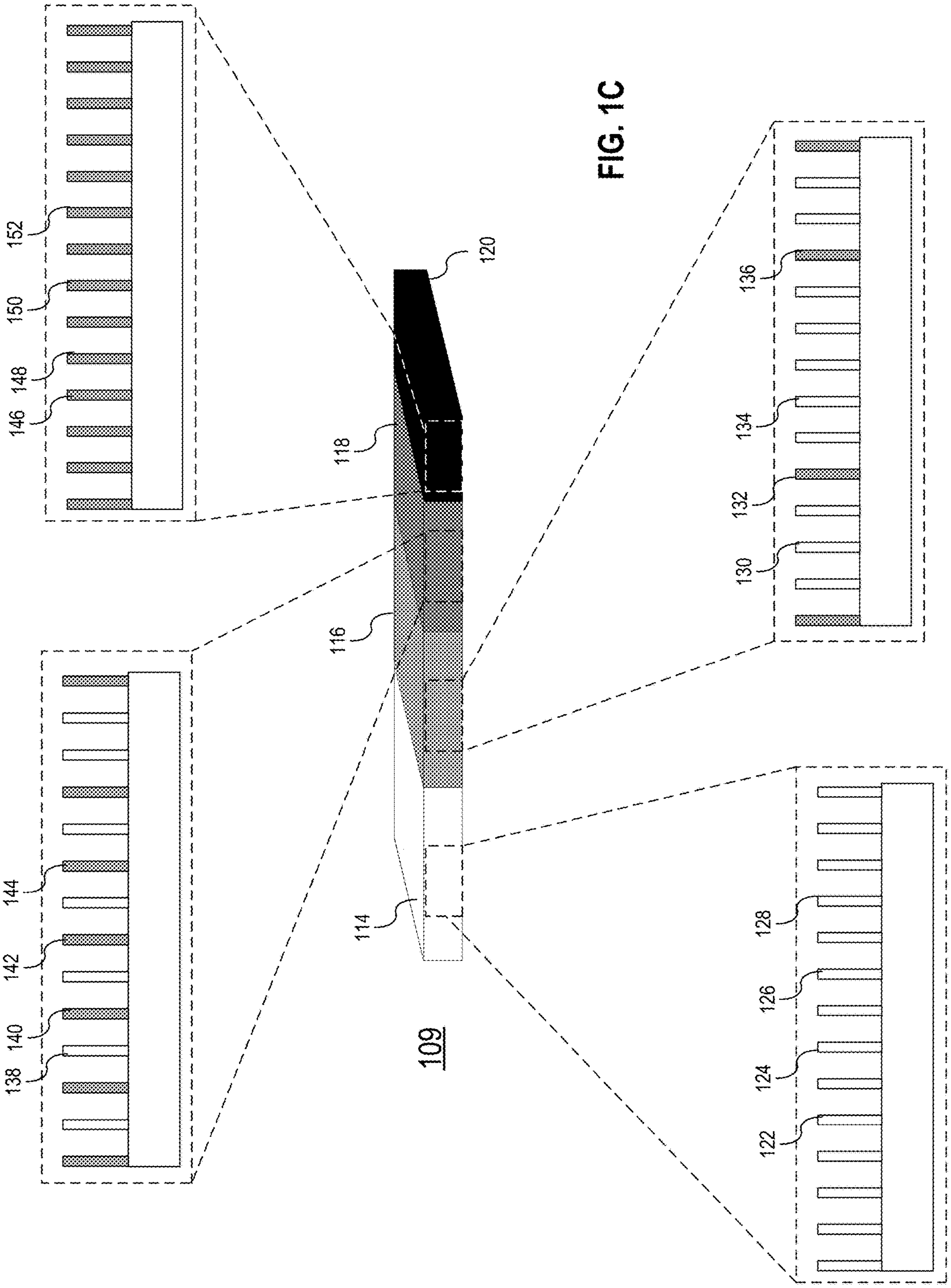
FIG. 1C depicts zones of a diffractive grating.

FIG. 1B depicts a diagram of an optical element of a head-mounted display (HMD) or other optical equipment. In some embodiments, optical element 101 of FIG. 1B is similar to optical element 100, except optical element 101 may include diffractive grating 109 instead of or in addition to diffractive grating 107 of FIG. 1A and may or may not be coupled to voltage source 112 of FIG. 1A. As shown in FIG. 1C, diffractive grating 109 may comprise a plurality of distinct zones or regions 114, 116, 118 and 120, or any other suitable number of zones. In some embodiments, each of zones 114, 116, 118 and 120 may comprise one or more distinct diffractive gratings structures. As an non-limiting example, zone 114 may comprise structures 122, 124, 126, 128 . . . n; zone 116 may comprise structures 130, 132, 134, 136 . . . n; zone 118 may comprise structures 138, 140, 142, 144 . . . n; and zone 120 may comprise structures 146, 148, 150, 152 . . . n.

In some embodiments, the structures that are formed in each of zones 114, 116, 118 and 120 may comprise one or more different materials and/or different ratios of the same or different one or more materials. For example, substantially all of zone 114 may comprise a first material, e.g., structures 122, 124, 126, 128, . . . n may comprise a low refractive index material. Structures in zone 116 may comprise each of a first material and a second material, e.g., structures 130, 134, . . . n may comprise a low refractive index material, and structures 132, 136, . . . n may comprise a high (or relatively higher) refractive index material. Structures in zone 118 may also comprise each of a first material and a second material, e.g., structures 138, . . . n of may comprise a low refractive index material, and structures 140, 142, 144 . . . n may comprise a high (or relatively higher) refractive index material. In some embodiments, a ratio of the second material to the first material in the structures defining zone 118 is higher than a ratio of the second material to the first material in the structures defining zone 116. In some embodiments, substantially all of the structures defining zone 120 may comprise the second material, e.g., structures 146, 148, 150, 152, . . . n of may comprise a high refractive index material. Such aspects may enable a gradual increase in refractive index along the length of (and/or at various positions in the depth of) diffractive grating 109. In some embodiments, the refractive index of each zone may be based on the refractive index of each material of a given zone, as well the ratio of materials within the given zone.

In some embodiments, a gradual increase in refractive index may be achieved by a consecutive increase in a volume fraction of a higher refractive index material to a lower refractive index material. In some embodiments, the increased spatial mixing of refractive index may create an effective increase in index with positional change. Such aspects may enable employing two or more materials of varying refractive indices to gradually and efficiently modulate the angular efficiency of a grating structure by locally modifying the refractive index of the grating directly encompassed into the grating structures, allowing for optimal performance of the waveguide. It may be desirable to increase the efficiency along the length of the diffractive grating since the amount of and/or angle of light propagating in the grating may change along the length of the diffractive grating, as portions of light are diffracted out towards the eye.

While the example of FIG. 1C shows two materials of different refractive indexes, any suitable number of materials of varying refractive indexes may be used. For example, where a third material has a refractive index that is greater than a refractive index of the first material but is lower than a refractive index of the second material, the structures defining zone 114 may comprise substantially all of the first material; each of the structures defining zone 116 and 118 may comprise any suitable combination of the first, second and/or third materials such that a refractive index of zone 118 exceeds zone 116; and the structures defining zone 120 may comprise substantially all of the second material. Within a particular zone, any suitable pattern of different materials may be used for different structures, and/or a particular structure may be substantially uniform with respect to a single material or may comprise any suitable combination of multiple materials.

In some embodiments, the materials of diffractive grating 107 of FIG. 1A may correspond to the materials of diffractive grating 109 of FIG. 1B, or may correspond to any other suitable combination of high refractive material and low refractive index material and/or transparent conductive material. In some embodiments, diffractive grating 107 of FIG. 1A may comprise substantially the same material through diffractive grating 107, or any other suitable distribution of materials of varying refractive indices.

In some embodiments, one or more of diffractive grating 106, 107 and 109 may be a superimposed grating comprising a surface relief grating on top of the flat surface 102 and a buried diffractive grating between the flat surfaces 102 and 104. In such superimposed grating, the surface relief grating may be placed less deep into the substrate of optical element than the buried diffractive grating. Optical element 100 or 101 may comprise any suitable number of superimposed gratings at any suitable position of the optical element.

In some embodiments, the first material, second material and/or third material discussed in FIG. 1C, or any other suitable combination of materials, may be deposited simultaneously, consecutively, one beside another, one on top of another, or one inside another, or any other suitable arrangement may be employed, and may be such materials may be patterned into specific features in a separate step. In some embodiments, the first material, second material and/or third material may be etched to achieve desired ratios of materials. In some embodiments, the combination of materials may be selected such that a refractive index generally increases along the length and/or depth of the diffractive grating.

While the structures defining zones in FIG. 1C are shown as being of relatively the same size and relatively the same shape, the zones may be defined in any suitable manner. For example, a zone and/or its structures may have any suitable dimensions, and may be of any suitable size and/or shape, to include any suitable combination of one or more materials.

FIGS. 2-8 depict different methods of creating diffractive gratings for use in optical elements for HMDs. Optical element 100 of FIG. 1A and optical element 101 of FIGS. 1B-1C may be generated using any of the methods described in FIGS. 2-6.

Figure 2:
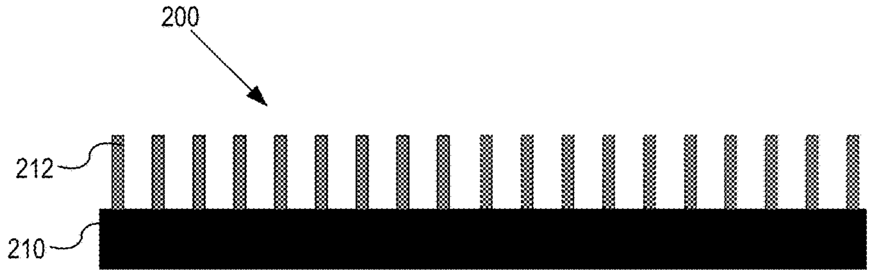
FIG. 2 depicts an example of fabricating a diffractive grating in an optical element using a transparent conductive material.

FIG. 2 depicts an example of fabricating a diffractive grating in an optical element using a transparent conductive material. Optical element 200 includes substrate 210. Substrate 210 may comprise a material with a high refractive index for fabricating the diffractive grating onto, such as glass or plastic. At step 202, transparent conductive material 212 is patterned onto the substrate. Transparent conductive material 212 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene): poly(styrene sulfonate) (PEDOT:PSS).

In some embodiments, the transparent conductive material is tuned to a particular implementation. For instance, indium tin oxide may be doped with more indium to create a more absorbent but less transparent diffractive grating or with more tin oxide to create a less absorbent but more transparent grating. This diversification allows the diffractive gratings to be used differently in different locations. For instance, in smaller locations, such as an in-coupling grating, a higher doping of indium would reduce the stray light in the system while having a relatively small effect on the usage of the waveguide as a lens. Conversely, in larger or more central locations, such as in the out-coupling grating, a higher doping of tin oxide would make it easier for one to see through the lens but would decrease the overall absorption of non-polarized or differently polarized light. In some embodiments, different diffractive gratings on a waveguide include different transparent conductive materials or different chemical makeups of a same transparent conductive material. For instance, if both the in-coupling and out-coupling gratings are fabricated with indium tin oxide, the in-coupling grating may be fabricated with indium tin oxide that is doped with indium to give the indium tin oxide in the in-coupling grating a higher percentage of indium than the indium tin oxide coupling grating. Additionally or alternatively, the out-coupling grating may be fabricated with indium tin oxide that is doped with tin oxide for the same or similar effect.

The transparent conductive material 212 may be patterned onto substrate 210 in any of a plurality of designs, including blazed patterns, slanted patterns, binary patterns, analogue structures, or varying depth structures. Techniques for patterning transparent conductive material 212 onto substrate 210 include any of electron beam lithography, interference lithography, nanoimprint lithography, hot embossing, photolithography, focused ion beams, laser ablation, physical vapor deposition, atomic layer deposition, chemical vapor deposition, nanoparticle inks, spin-casting, dip-coating, or any other lithography, patterning, coating techniques or combination thereof. For instance, a coating technique, such as chemical vapor deposition may be used to coat the substrate with the transparent conductive material. Following the coating of the substrate, strips of the transparent conductive material may be removed through a lithographic technique, such as electron beam lithography of a resist followed by an etching and lift-off step.

In some embodiments, the transparent conductive material is patterned onto the substrate in a manner that produces gaps between each strip. For instance, some lithographic techniques provide a thin layer of the material between each of the strips to provide additional support. The transparent conductive material may be applied without the thin layer and/or the thin layer may be removed through ablation techniques to ensure that the spaces between the transparent conductive material do not include any of the transparent conductive material. In some embodiments, transparent conductive material 212 may be connected to a voltage source 112, and any suitable portion of the diffractive grating may include transparent conductive material 212, at least a portion of which may form one or more microheaters.

In some embodiments, the transparent conductive material may be connected to a voltage source 112, and any suitable portion of the diffractive grating may include transparent conductive material, at least a portion of which may form one or more microheaters, and voltage may be applied to such microheaters along a length and/or depth of the diffractive grating to selectively modulate the refractive index of one or more portions of the diffractive grating.

Figure 3:
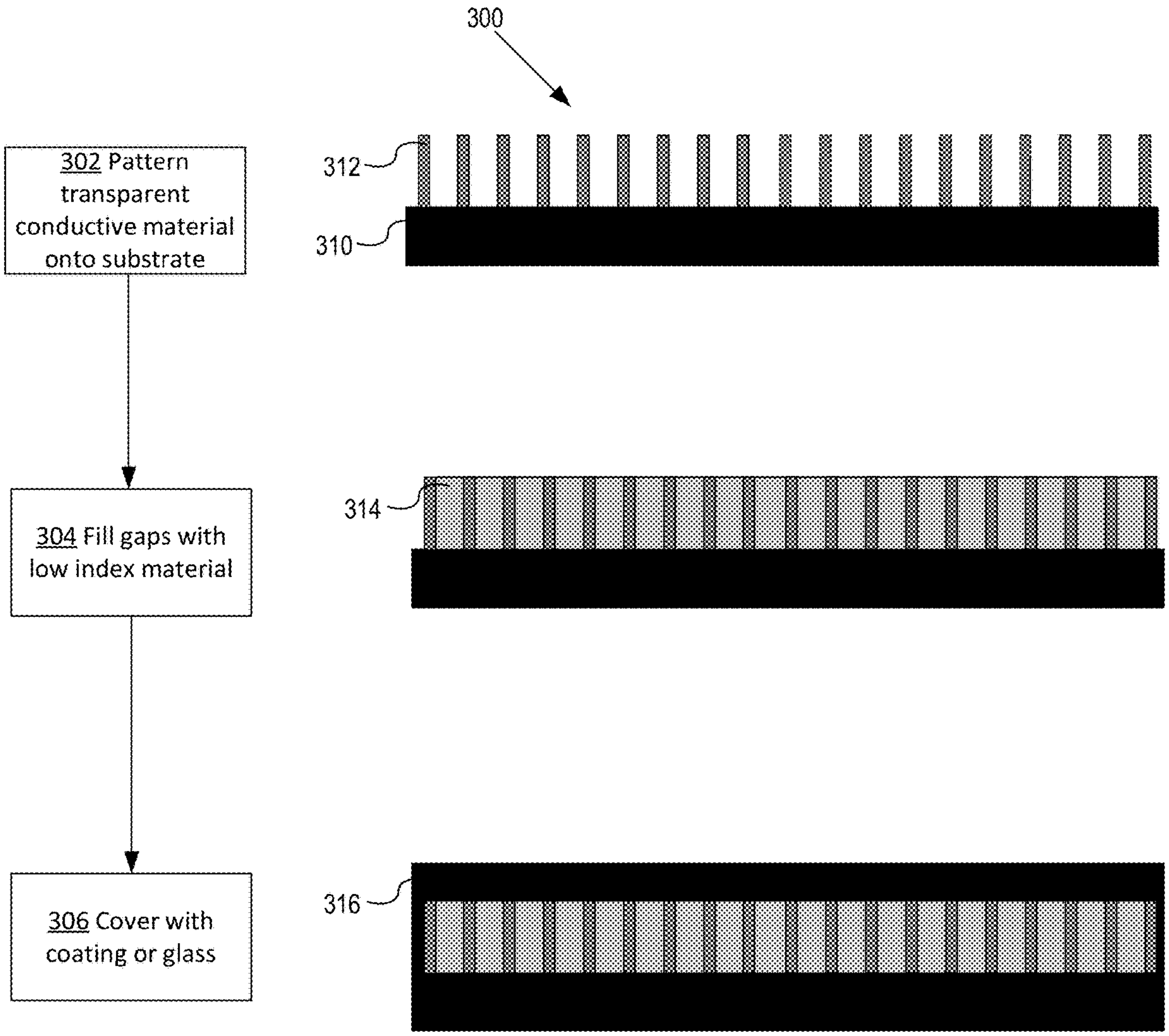
FIG. 3 depicts an example of fabricating a buried diffractive grating in an optical element using a transparent conductive material and a low-refractive index material.

FIG. 3 depicts an example of fabricating a buried diffractive grating in an optical element using a transparent conductive material and a low-refractive index material. Optical element 300 includes substrate 310. Substrate 310 may comprise a material with a high refractive index for fabricating the transparent conductive material as a buried diffractive grating onto, such as glass or plastic. At step 302, transparent conductive material 312 is patterned onto the substrate using the techniques described herein. Transparent conductive material 312 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly (3,4-ethylenedioxythiophene): poly(styrene sulfonate) (PEDOT:PSS).

At step 304, a low index material 314 is patterned onto the substrate. Low index material 314 may comprise a material with a refractive index that is substantially lower than the refractive index of substrate 310, such as lithium fluoride, calcium fluoride, magnesium fluoride, or a low refractive index optical resin. Substantially lower, as used herein, may refer to a difference of 0.4 or greater between the two indices.

The low index material 314 may be patterned onto substrate 310 in between the strips of transparent conductive material 312 using lithographic and/or patterning techniques, such as electron beam lithography, interference lithography, nanoimprint lithography, hot embossing, photolithography with a pattern transfer, reactive ion etching and deposition of the low index material, physical vapor deposition, atomic layer deposition, chemical vapor deposition, application of nanoparticle inks, spin casting, dip-coating, or any combination of techniques, such as coating the low index material 314 onto the substrate on top of the transparent conductive material 312 and removing excess material through lithographic techniques.

At step 306, a high index coating 316 or separate sheet of glass or plastic is applied to cover transparent conductive material 312, low index material 314, and substrate 310. High index coating 316 may comprise any of cubic zirconium oxide, titanium oxide, aluminum oxide, diamond, hafnium oxide, tantalum oxide, zinc oxide, or a high-index resins. In some embodiments, high index coating 316 is selected to have a refractive index that is substantially equal to the refractive index of substrate 310. Processes for coating the high-index coating 316 onto the transparent conductive material 312, low index material 314, and substrate 310 include any of physical vapor deposition, atomic layer deposition, chemical vapor deposition, application of nanoparticle inks, spin casting, or dip-coating. Additionally or alternatively, a sheet of glass or plastic may be laser bonded to the transparent conductive material 312 and low index material 314. An additional processing step may include polishing or otherwise thinning the sheet of glass to a desired thickness.

While FIG. 3 depicts the fabrication of a buried diffractive grating in an optical element, in some embodiments, a surface relief grating may additionally or alternatively be fabricated in the optical element. In some embodiments, diffractive grating 316 may be patterned on multiple sides of substrate 310. In some embodiments, the transparent conductive material may be connected to a voltage source 112, and any suitable portion of the diffractive grating may include transparent conductive material, at least a portion of which may form one or more microheaters, and voltage may be applied to such microheaters along a length and/or depth of the diffractive grating to selectively modulate the refractive index of one or more portions of the diffractive grating.

Figure 4:
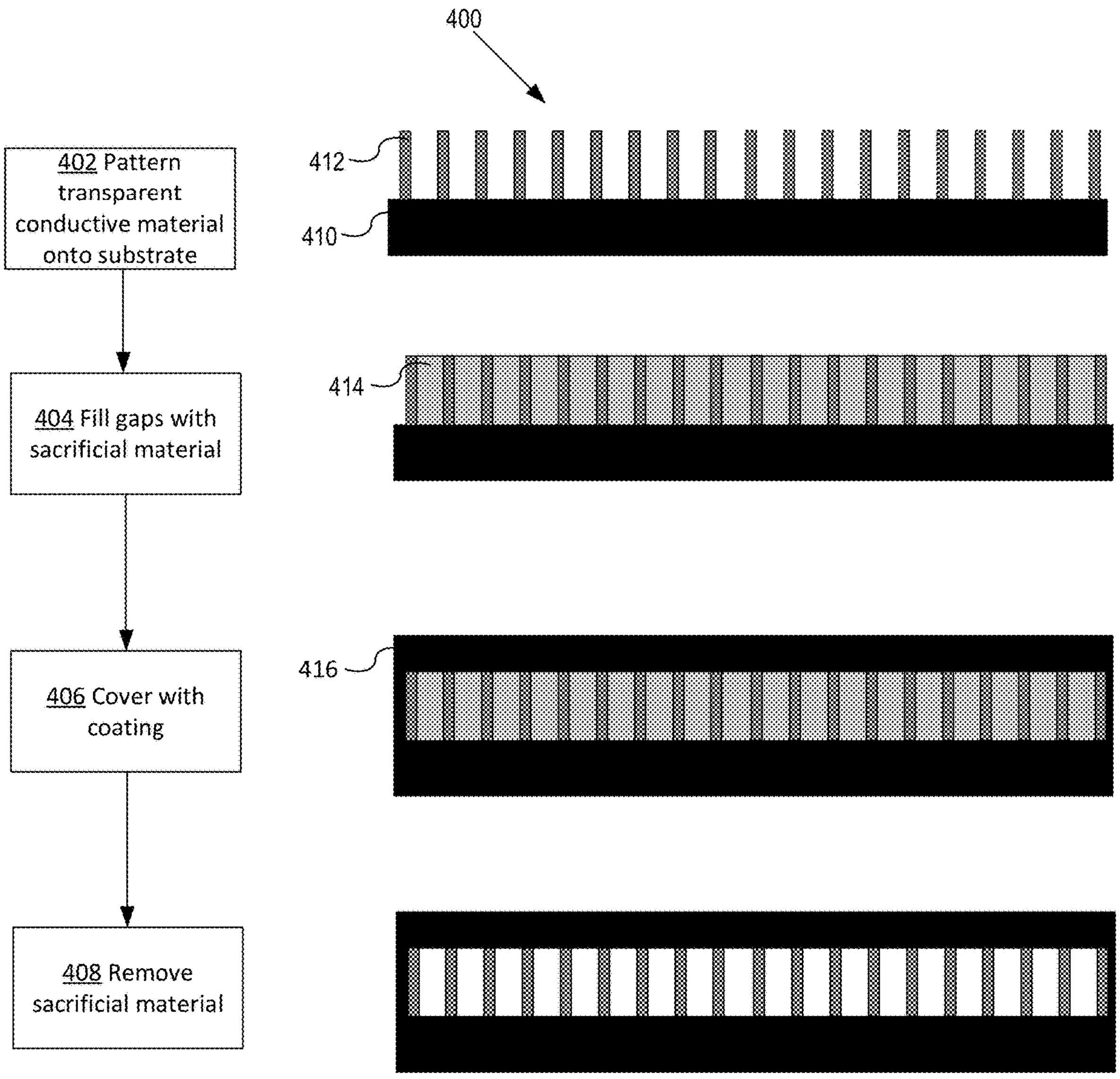
FIG. 4 depicts an example of fabricating a buried diffractive grating in an optical element using a transparent conductive material and a sacrificial material.

FIG. 4 depicts an example of fabricating a buried diffractive grating in an optical element using a transparent conductive material and a sacrificial material. Optical element 400 includes substrate 410. Substrate 410 may comprise a material with a high refractive index for fabricating the buried diffractive grating onto, such as glass or plastic. At step 402, transparent conductive material 412 is patterned onto the substrate. Transparent conductive material 412 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene): poly (styrene sulfonate) (PEDOT:PSS).

At step 404, sacrificial material 414 is patterned onto the substrate in between the strips of transparent conductive material. Sacrificial material 414 may comprise a soluble or dissolvable material, such as a photoresist, a water-soluble polymer or material, or organic-solvent soluble polymer or material. One example of sacrificial material includes water soluble polyvinyl alcohol.

At step 406, a high index coating 416 is applied to cover transparent conductive material 412, sacrificial material 414, and substrate 410. High index coating 416 may comprise any of cubic zirconium oxide, titanium oxide, aluminum oxide, diamond, hafnium oxide, tantalum oxide, zinc oxide, or a high-index resin. In some embodiments, high index coating 416 is selected to have a refractive index that is substantially equal to the refractive index of substrate 410. Processes for coating the high-index coating onto the transparent conductive material 412, sacrificial material 414, and substrate 240 include any of physical vapor deposition, atomic layer deposition, chemical vapor deposition, application of nanoparticle inks, spin casting, or dip-coating.

At step 408, after the high index coating has been applied to cover transparent conductive material 412, sacrificial material 414, and substrate 410, the sacrificial material is removed. For example, a sintering or dissolution process may be applied to optical element 400 to remove sacrificial material. While FIG. 4 depicts the fabrication of a buried diffractive grating in an optical element, in some embodiments, a surface relief grating may additionally or alternatively be fabricated in the optical element. In some embodiments, the diffractive grating may be patterned on multiple sides of substrate 410. In some embodiments, the transparent conductive material may be connected to a voltage source 112, and any suitable portion of the diffractive grating may include transparent conductive material, at least a portion of which may form one or more microheaters, and voltage may be applied to such microheaters along a length and/or depth of the diffractive grating to selectively modulate the refractive index of one or more portions of the diffractive grating.

Figure 5:
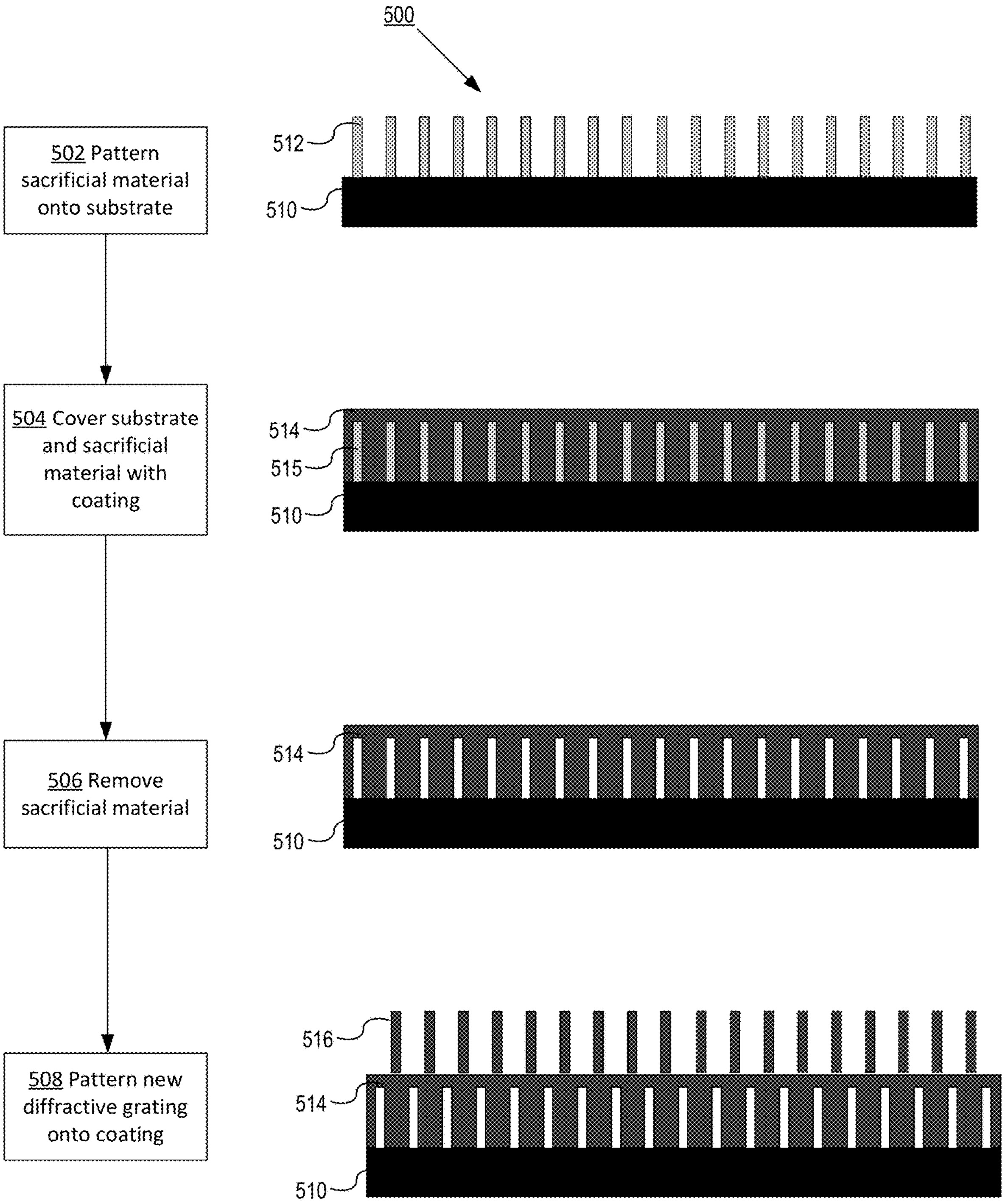
FIG. 5 depicts an example of fabricating diffractive gratings in an optical element using sacrificial material.

FIG. 5 depicts an example of fabricating diffractive gratings in an optical element using sacrificial material. Optical element 500 includes substrate 510. Substrate 510 may comprise a material with a high refractive index for fabricating the diffractive grating onto, such as glass or plastic. At step 502, sacrificial material 512 is patterned onto the substrate. Sacrificial material 512 may comprise a soluble or dissolvable material, such as a photoresist; a water-soluble polymer or material; or an organic-solvent soluble polymer or material. One example of sacrificial material includes water soluble polyvinyl alcohol.

The sacrificial material 512 may be patterned onto substrate 510 in any of a plurality of designs, including blazed patterns, slanted patterns, binary patterns, analogue structures, or varying-depth structures. Techniques for patterning sacrificial material 512 onto substrate 510 include any of electron beam lithography, interference lithography, nanoimprint lithography, hot embossing, photolithography, focused ion beams, or any other lithography or patterning techniques.

At step 504, a high-index coating 514 is applied to cover sacrificial material 512 and substrate 510. High-index coating 514 may comprise any of cubic zirconium oxide, titanium oxide, aluminum oxide, diamond, hafnium oxide, tantalum oxide, zinc oxide, or a high-index resin. In some embodiments, high index coating 514 is selected to have a refractive index that is substantially equal to the refractive index of substrate 510. Processes for coating the high-index coating onto the sacrificial material 512 and substrate 510 include any of physical vapor deposition, atomic layer deposition, chemical vapor deposition, application of nanoparticle inks, spin coating, or dip-coating. In some embodiments, high-index coating 514 may correspond to one or more materials of various refractive indexes, as described in FIG. 1C, and the refractive indexes of such one or more materials may increase along a length and/or along a depth of the diffractive grating.

At step 506, after the high index coating has been applied to cover sacrificial material 512 and substrate 510, sacrificial material 512 may be removed. For example, a sintering or dissolution process may be applied to optical element 500 to remove the sacrificial material.

At step 508, a new diffractive grating 516 may be patterned on top of coating 514. The new diffractive grating 516 may be patterned onto coating 514 in any of a plurality of designs, including blazed patterns, slanted patterns, or binary patterns, analogue structures, or any other suitable design, or any combination thereof. The design of new diffractive grating 516 may be a same design as the design of the sacrificial material 512 or a different design. Techniques for patterning new diffractive grating 516 onto coating 514 may include any of electron beam lithography, interference lithography, nanoimprint lithography, hot embossing, photolithography, focused ion beams, or any other lithography or patterning techniques. In some embodiments, the new diffractive grating 516 is fabricated using a transparent conductive material.

While FIG. 5 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 516 may be patterned on multiple sides of substrate 510.

While FIG. 5 depicts the sacrificial material being separately patterned on, other embodiments may include different processes for creating patterns of sacrificial materials on substrate 510. For example, the sacrificial material may be applied to cover optical element 500 in a single layer. A stamp may then be pressed onto the sacrificial material to create the pattern depicted in FIG. 5. While the stamp is in place, ultraviolet nanoimprint lithography or thermal nanoimprint lithography may be used to harden the sacrificial material into place. The stamp may then be removed, thereby leaving a structure with a pattern of sacrificial material similar to the structure made through patterning of sacrificial material. Steps 504 and 506 may then proceed in the same way as described with respect to FIG. 5.

Figure 6:
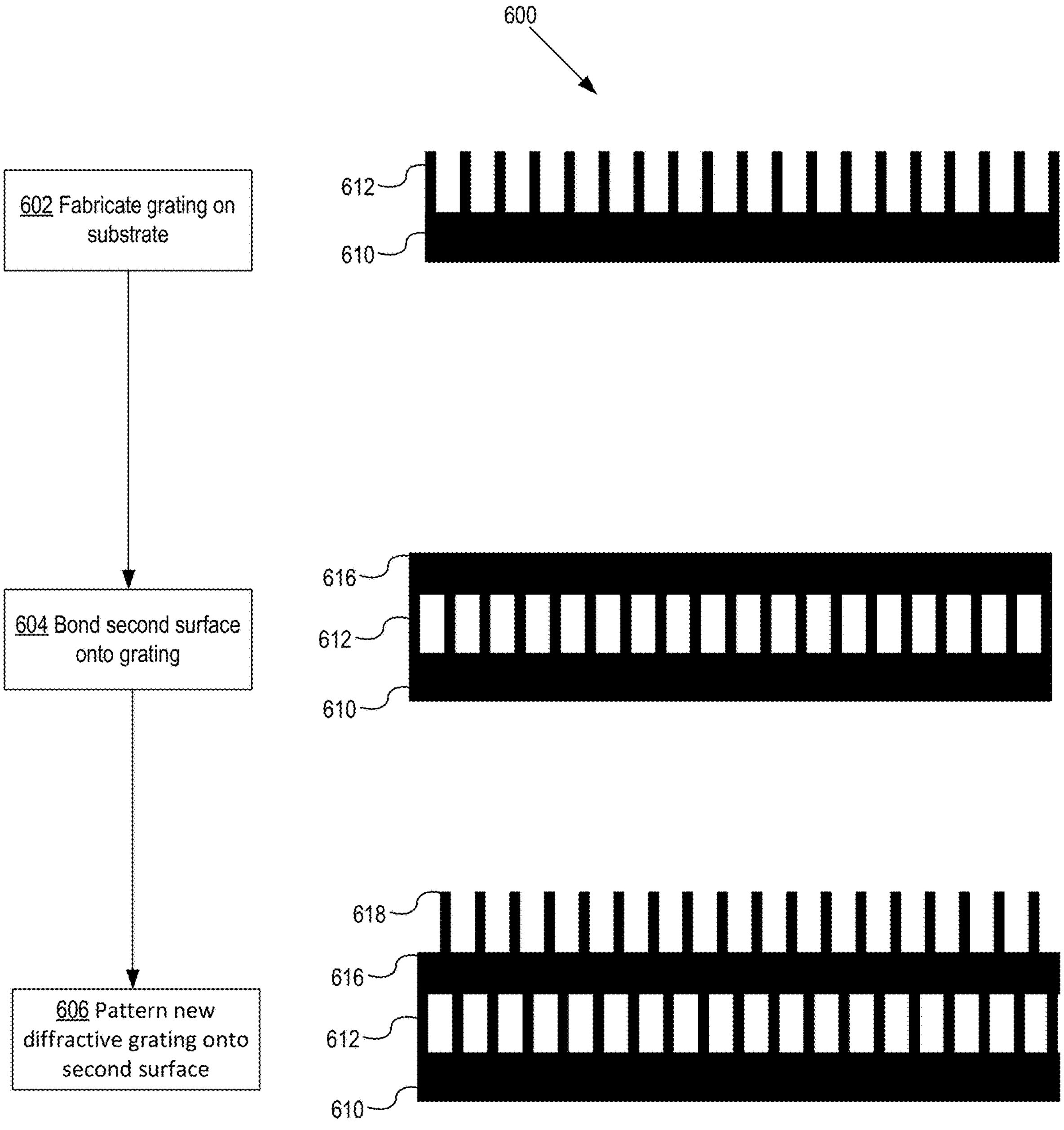
FIG. 6 depicts an example of fabricating diffractive gratings in an optical element using laser bonding.

FIG. 6 depicts an example of fabricating diffractive gratings in an optical element using laser bonding. Optical element 600 includes substrate 610. Substrate 610 may comprise a material with a high refractive index for fabricating the diffractive grating onto, such as glass or plastic. At step 602, grating 612 is fabricated onto substrate 610. For example, a standard surface relief grating may be fabricated onto the surface of substrate 310, such as through laser etching/ablation. In some embodiments, grating 612 may correspond to one or more materials of various refractive indexes, as described in FIG. 1C, and the refractive indexes of such one or more materials may increase along a length and/or along a depth of the diffractive grating.

At step 604, a second surface 616 may be bonded onto the grating to generate a buried diffractive grating via laser direct bonding in an adhesive-free process. The second surface 616 may comprise a material with a substantially equal refractive index as the material of substrate 610. In some embodiments, the second surface 616 is a same material as substrate 610. For example, both materials may be glass with a same refractive index. The second surface may be attached to the first surface and grating through any bonding techniques, such as direct glass laser bonding.

At step 606, a new diffractive grating 618 may be fabricated onto the second surface 616. For example, a standard surface relief grating may be fabricated onto the surface of second surface 616, such as through laser etching/ablation. In some embodiments, the surface relief grating comprises a high index material that is patterned onto the second surface using any of the techniques previously described herein. In some embodiments, the high index material comprises a transparent conductive material. The design of the new diffractive grating 618 may be a same design as the design of the grating 612 and/or a different design.

While FIG. 6 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 618 may be patterned on multiple sides of substrate 610.

Figure 7:
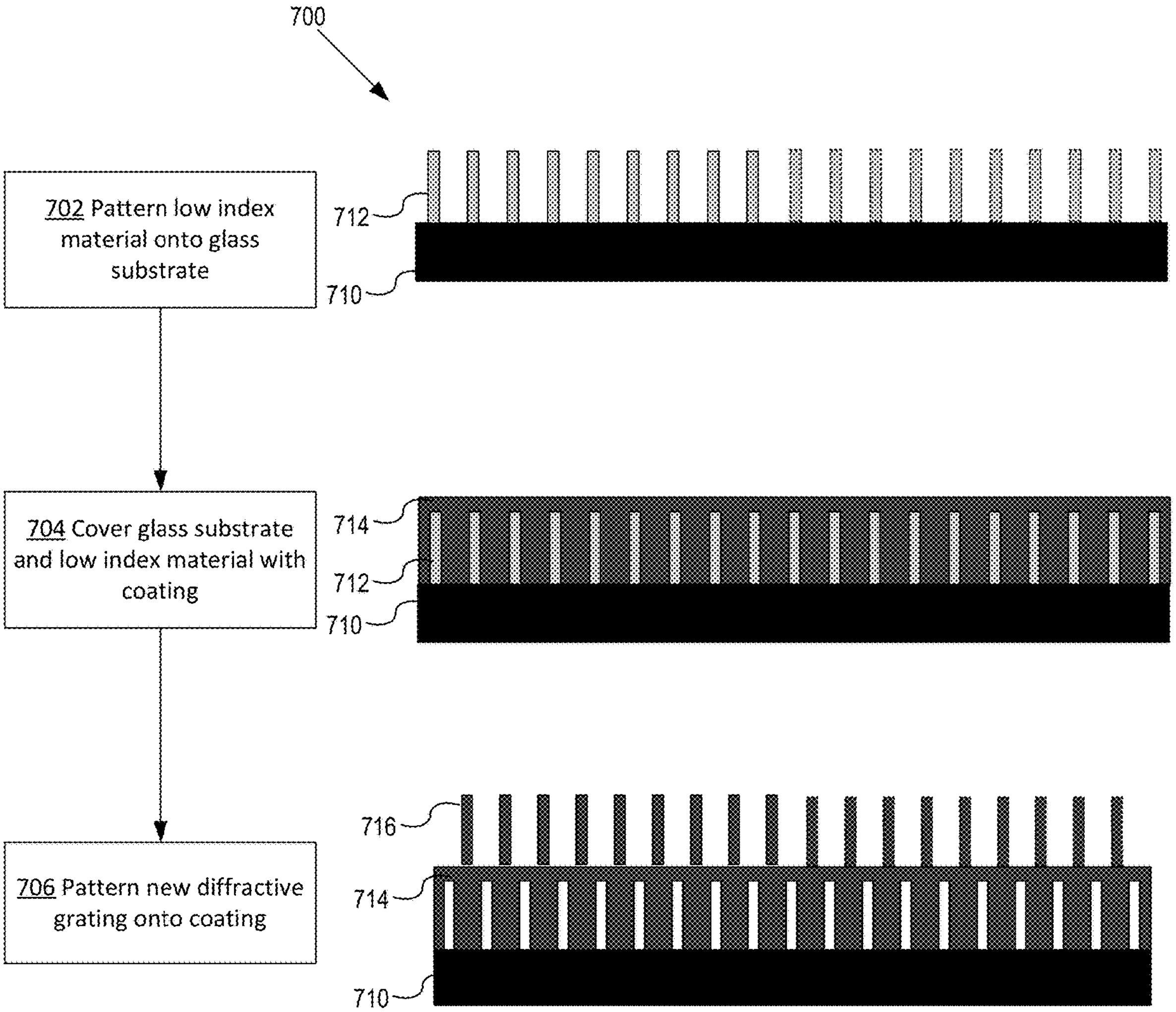
FIG. 7 depicts an example of fabricating diffractive gratings in an optical element using a low-refractive index material.

FIG. 7 depicts an example of fabricating diffractive gratings in an optical element using a low-refractive index material. Optical element 700 includes substrate 710. Substrate 710 may comprise a material with a high refractive index for fabricating a buried diffractive grating onto, such as glass or plastic. At step 702, a low-refractive index material 712 is patterned onto the substrate. Low-index material 712 may comprise a material with a refractive index that is substantially lower than the refractive index of substrate 710, such as lithium fluoride, calcium fluoride, magnesium fluoride, or a low refractive index optical resin. Substantially lower, as used herein, refers to a difference of 0.5 or greater between the two indices.

In some embodiments, the low index material 712 may be patterned onto substrate 710 in any of a plurality of designs, including blazed patterns, slanted patterns, binary patterns, analogue structures, or varying-depth structures. Techniques for patterning low-index material 712 onto substrate 710 include any of electron beam lithography, interference lithography, nanoimprint lithography, hot embossing, photolithography with a pattern transfer, reactive ion etching and deposition of the low index material, or any other lithography or patterning techniques.

At step 704, a high index coating 714 is applied to cover low index material 712 and substrate 710. High index coating 714 may comprise any of cubic zirconium oxide, titanium oxide, aluminum oxide, diamond, hafnium oxide, tantalum oxide, zinc oxide, or a high-index resin. In some embodiments, high index coating 714 is selected to have a refractive index that is substantially equal to the refractive index of substrate 710. Processes for coating the high-index coating onto the low index material 712 and substrate 710 include any of physical vapor deposition, atomic layer deposition, chemical vapor deposition, application of nanoparticle inks, spin coating, or dip-coating. In some embodiments, high-index coating 714 may correspond to one or more materials of various refractive indexes, as described in FIG. 1C, and the refractive indexes of such one or more materials may increase along a length and/or along a depth of the diffractive grating.

At step 706, a new diffractive grating 716 may be patterned onto the high index coating 714. The new diffractive grating 716 may be patterned onto high index coating 714 in any of a plurality of designs, including blazed patterns, slanted patterns, binary patterns, or analogue structures. The design of the new diffractive grating 716 may be a same design as the design of the low index material 712 and/or a different design. Techniques for patterning new diffractive grating 716 onto high index coating 714 include any of electron beam lithography, interference lithography, nanoimprint lithography, hot embossing, photolithography, focused ion beams, or any other lithography or patterning techniques. In some embodiments, the new diffractive grating 716 is fabricated using a transparent conductive material.

While FIG. 7 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 716 may be patterned on multiple sides of substrate 710.

Figure 8:
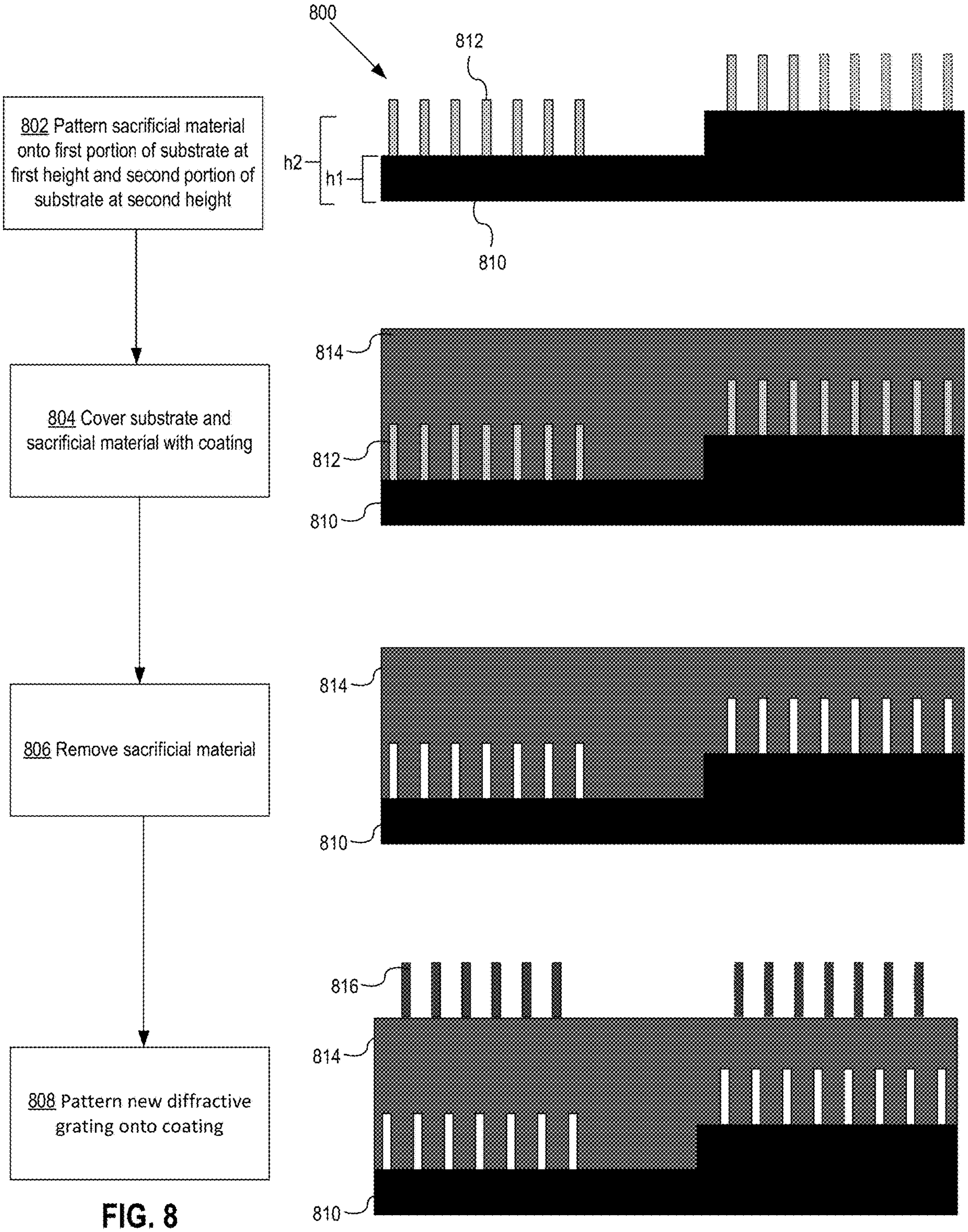
FIG. 8 depicts an example of fabricating diffractive gratings at multiple depths in an optical element.

FIG. 8 depicts an example of fabricating diffractive gratings at multiple depths in an optical element. Optical element 800 includes substrate 810 at a plurality of varying heights. Substrate 810 may comprise a material with a high refractive index for fabricating the diffractive grating onto, such as glass or plastic. Substrate 810 may be fabricated to have varying heights through bonding of multiple pieces of substrate, such as laser bonding of glass, and/or through removal of a portion of the substrate, such as by laser etching or other glass cutting processes. The varying heights may be fabricated in a location designated for a single diffractive grating and/or in locations for different diffractive gratings such that a first location is a first height and a second location is a second height.

At step 802, sacrificial material 812 is patterned onto the substrate at the plurality of varying heights. Sacrificial material 812 may comprise a soluble or dissolvable material, such as a photoresist, a water-soluble polymer or material, or an organic-solvent soluble polymer or material. One example of sacrificial material includes water soluble polyvinyl alcohol.

The sacrificial material 812 may be patterned onto substrate 810 in any of a plurality of designs, including blazed patterns, slanted patterns, binary patterns, analogue structures, or varying-depth structures. Techniques for patterning sacrificial material 812 onto substrate 810 include any of electron beam lithography, interference lithography, nanoimprint lithography, hot embossing, photolithography, focused ion beams, or any other lithography or patterning techniques.

At step 804, a high index coating 814 is applied to cover sacrificial material 512 and substrate 510. High index coating 814 may comprise any of cubic zirconium oxide, titanium oxide, aluminum oxide, diamond, hafnium oxide, tantalum oxide, zinc oxide, or any other high-index resins. In some embodiments, high index coating 814 is selected to have a refractive index that is substantially equal to the refractive index of substrate 810. Processes for coating the high-index coating onto the sacrificial material 812 and substrate 8510 include any of physical vapor deposition, atomic layer deposition, chemical vapor deposition, application of nanoparticle inks, spin casting, or dip-coating. In some embodiments, high-index coating 814 may correspond to one or more materials of various refractive indexes, as described in FIG. 1C, and the refractive indexes of such one or more materials may increase along a length and/or along a depth of the diffractive grating.

At step 806, after the high index coating has been applied to cover sacrificial material 812 and substrate 810, the sacrificial material is removed. For example, a sintering or dissolution process may be applied to optical element 800 to remove sacrificial material.

At step 808, a new diffractive grating 816 may be patterned onto the high index coating 814. The new diffractive grating 816 may be patterned onto high index coating 514 in any of a plurality of designs, including blazed patterns, slanted patterns, binary patterns, or analogue structures. The design of the new diffractive grating 816 may be a same design as the design of the sacrificial material 812 and/or a different design. Techniques for patterning new diffractive grating 816 onto high index coating 814 include any of electron beam lithography, interference lithography, nanoimprint lithography, hot embossing, photolithography, focused ion beams, or any other lithography or patterning techniques. In some embodiments, the new diffractive grating 816 is fabricated using a transparent conductive material.

While FIG. 8 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 816 may be patterned on multiple sides of substrate 810.

While FIG. 8 depicts a method of fabricating diffractive gratings with varying-depth diffractive gratings, other embodiments of fabricating a diffractive grating with varying-depth diffractive gratings may include laser bonding of glass at different widths, using methods described in respect to FIG. 6, or coating a low-index material with a high-index material, using methods described in respect to FIG. 7. Additionally, while FIG. 8 depicts a diffractive grating with diffractive gratings at different depths, in some embodiments, only a strict subset of the different depths is used to create the diffractive grating. Thus, the diffractive grating may include a diffractive grating that is situated at a different depth than another diffractive grating.

In some embodiments, a superimposed grating structure may be employed in which a low refractive index material (e.g., solid materials with relatively low refractive indices, such as lithium fluoride, calcium fluoride, magnesium fluoride, or optical resins, or nonsolid pockets, such as pockets of air, vacuum, or gas) is provided in combination with a transparent conductive oxide-based high refractive index surface relief grating. Such superimposed grating structure may have s high diffraction efficiency, since the difference in refractive index between the waveguide base material and air or other low refractive material may be exploited twice, e.g., it may be considered that the refractive index difference is doubled. In such superimposed structure, the buried and/or surface relief grating structures may be connected to a corresponding voltage source, and/or one or more materials of such structure may be changed along a depth and/or length of the waveguide to gradually increase a refractive index of the one or more materials or combination thereof. For example, in the example of FIG. 8, surface gratings 816 and/or buried gratings at a right-hand portion of the structure may be configured to have a higher refractive index (e.g., based on one or more materials in a volume composition of the portion and/or based on a voltage applied to such portion) than portions towards the center and left-hand portion of the structure.

The fabrication techniques described herein with respect to FIGS. 2-8 provide a wide array of benefits. One such benefit is that buried diffractive gratings can be fabricated in different structures within the optical element, such as blazed structures, slanted structures, binary structures, analogue structures, or varying-depth structures. In particular, surface relief gratings with varying-depth structures are difficult to manufacture. In contrast, buried diffractive gratings can be fabricated at different depths depending on need, with some embodiments including buried diffractive gratings in a center of the optical element and other embodiments including buried diffractive gratings closer to one surface of the optical element than the other. In addition, a single diffractive grating can be fabricated with portions of the buried diffractive grating at different depths. In some embodiments, different buried diffractive gratings in a single optical element can be fabricated at different depths, such as an in-coupling grating at a first depth and an out-coupling grating at a second depth. Such techniques enable different types of structures to be used in combination to produce different effects, e.g., improved diffraction efficiency and image quality.

Figure 9A:
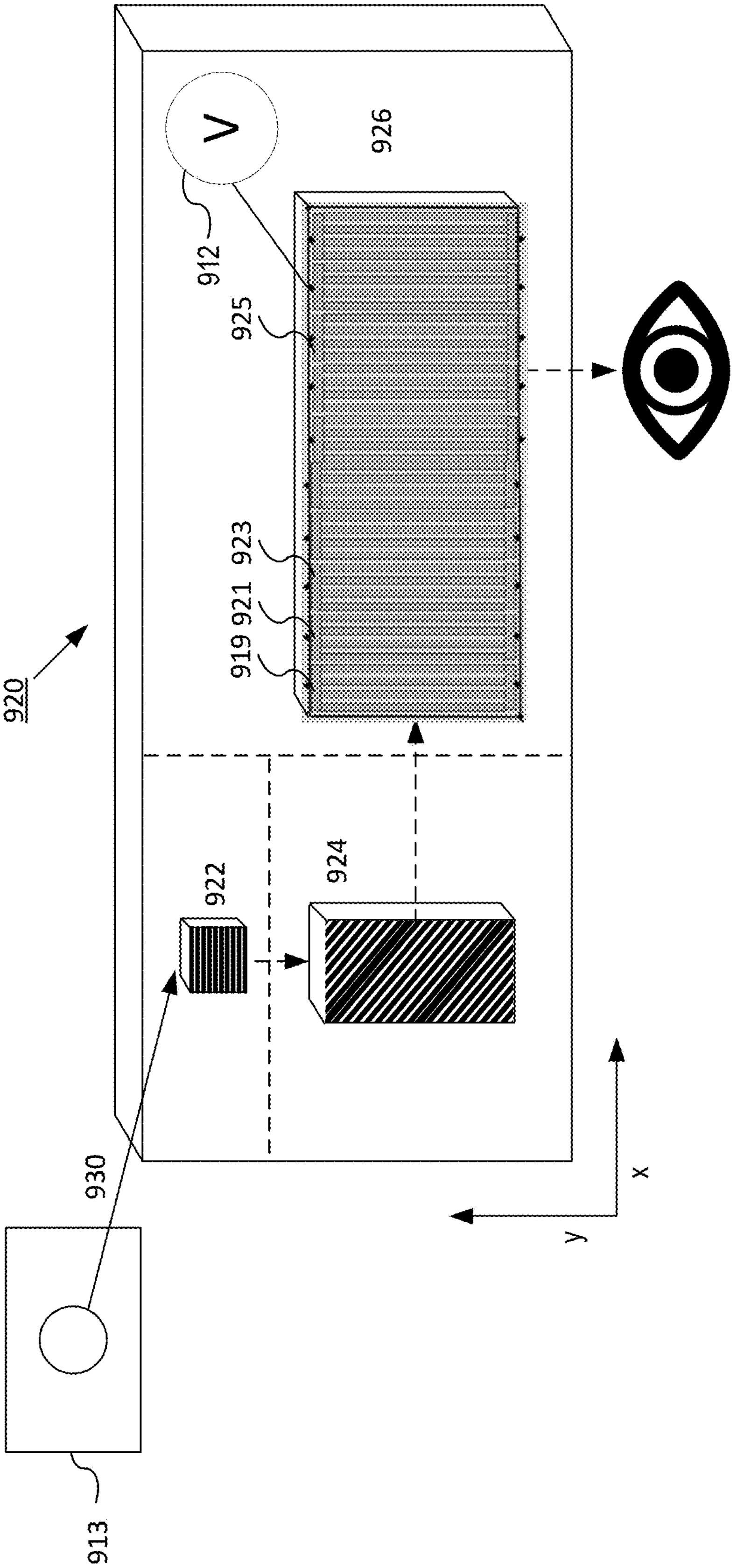
FIGS. 9A-9C depict diagrams of a plurality of diffraction gratings of an optical element of an HMD, or other suitable optical equipment.
Figure 9B:
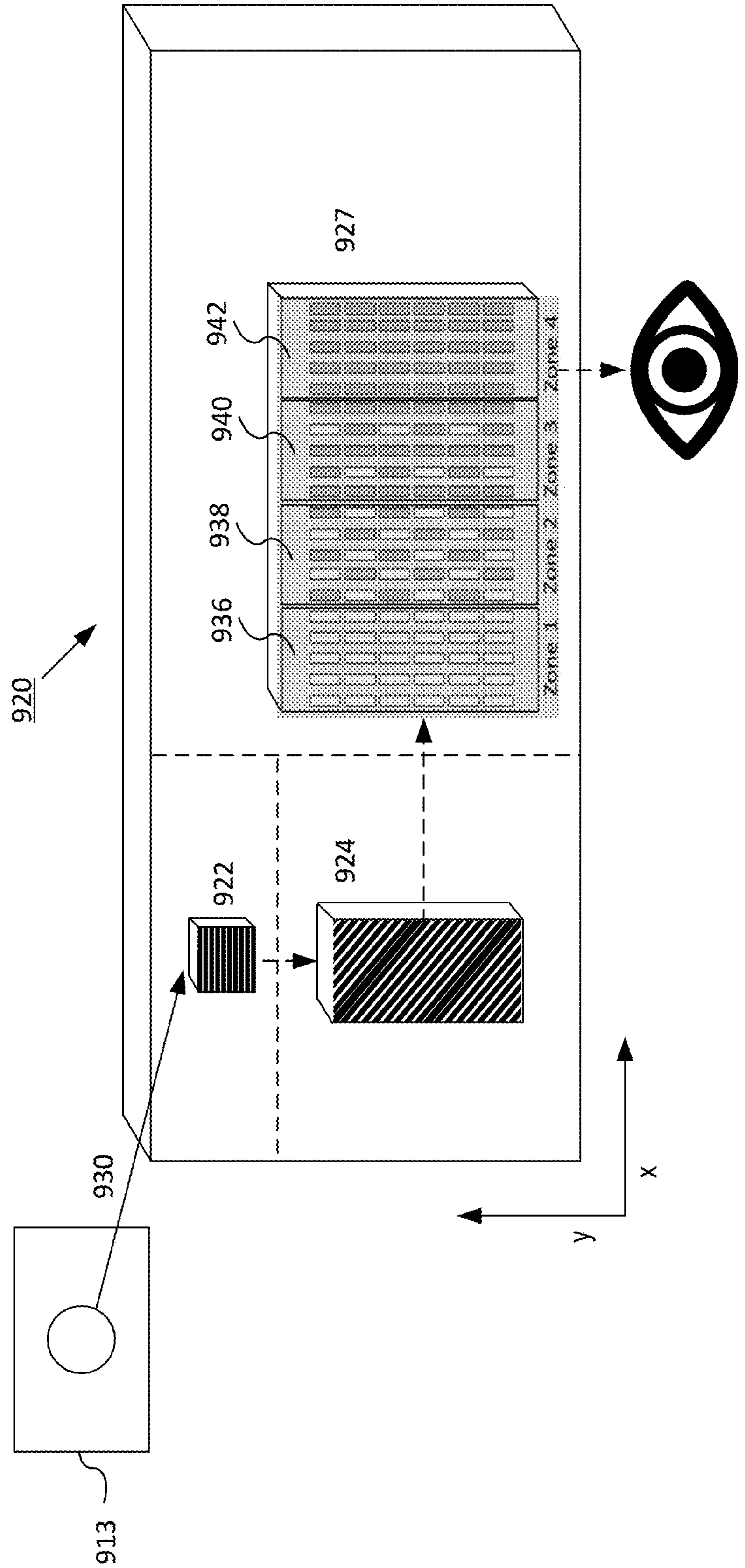
Figure 9C:
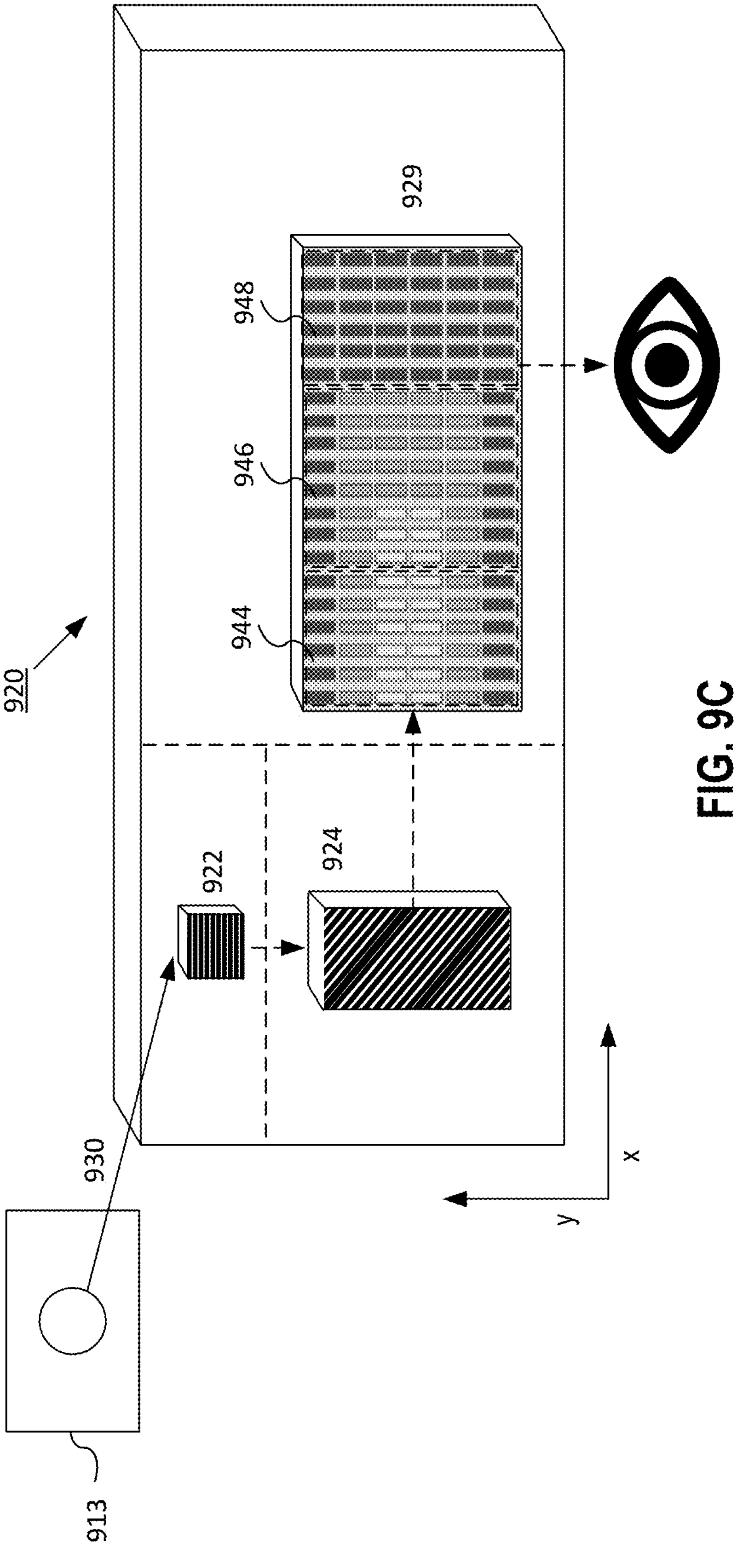

FIGS. 9A-9C depict diagrams of a plurality of diffraction gratings of an optical element of an HMD, or other suitable optical equipment. Optical element 920 comprises in-coupling grating 922, expansion grating 924, and out-coupling grating 926. Any of in-coupling grating 922, expansion grating 924, and out-coupling grating 926 may comprise diffractive gratings as described herein. While FIG. 9A depicts three diffractive gratings, other embodiments may include more or less diffractive gratings. For example, an optical element may include a plurality of expansion gratings including a first expansion grating that expands the image beam in a first direction and a second expansion grating that expands the image beam in a second direction perpendicular to the first direction.

As shown in FIG. 9A, out-coupling grating 926 may comprise a plurality of portions or segments 919, 921, 923, 925 . . . n, one or more of which may be connected to voltage source 912 or may be connected to respective voltage sources or any other suitable voltage source to enable such segments or portions of grating 926 to function as microheaters. For example, such microheaters may be configured to actively and locally modify a refractive index of a corresponding portion of grating 926. In some embodiments, the microheaters may comprise any suitable conductive material, and may be used to cause a refractive index of grating 926 to increase gradually (e.g., along a length and/or depth of grating 926). For example, voltage source 912 may be used to apply electric current to segment or portion 925, to cause a refractive index of segment or portion 925 to exceed a refractive index of each of segments or portions 919, 921, and 923. In some embodiments, voltage source 912 may be included in or may be external to the waveguide.

As shown in FIG. 9B, out-coupling grating 926 may comprise a plurality of zones 936, 938, 940 and 942. In some embodiments, zones 936, 938, 940 and 942 may correspond to zones 114, 116, 118 and 120, respectively, of FIG. 1C. For example, grating structures in zone 936 may be of substantially one material (e.g., a first material of a relatively low refractive index); grating structures in zone 942 may be of substantially one material (e.g., a second material of a relatively high refractive index); and grating structures in each of zone 938 and 940 may comprise each of the first material and the second material, where a ratio of the second material to the first material in zone 940 may exceed the ratio of the second material to the first material in zone 938.

As shown in FIG. 9C, out-coupling grating 929 may comprise zone 944, 946 and 948. For example, grating structures in zone 944 may comprise each of a first material, a second material, and a third material, where a refractive index of the third material may be higher than a refractive index of a second material and a first material, and a refractive index of the second material may be higher than a refractive index of the first material; grating structures in zone 946 may comprise each of the first material, the second material, and the third material; and grating structures in zone 948 may be of substantially one material (e.g., the third material having a higher refractive index than the first and second material). Grating structures in zone 944 may comprise a higher ratio of the first material than zone 946, and grating structures in zone 946 may contain a higher ratio of the second material and the third material than grating structures in zone 944. In FIGS. 9B-9C, the one or more materials of the grating structures of the zones may be selected such that a refractive index of grating 927 or 929 gradually increases along the length of the grating from zone 936 to zone 940 (and from zone 944 to zone 948). For example, the volume percentage of two materials with a different refractive index may be gradually changed. The zones of the diffractive gratings may be defined in any suitable manner in any suitable dimensions, size or shapes. For example, in FIG. 9C, the zones may be defined on the basis of distinct materials, e.g., portion(s) of the grating being of the first material may be a first zone, portion(s) of the grating being of the second material may be a second zone, and portion(s) of the grating being of the third material may be a third zone.

The arrangement of FIGS. 9A, 9B and/or 9C may be employed to increase in diffraction efficiency along the waveguide. For example, since at least a portion of light may be transmitted out of the waveguide as the light propagates through the waveguide, it may be desirable that gratings further along a length (and/or depth) of the waveguide (e.g., an expansion grating or an out-coupling grating) be configured to have enhanced efficiency as compared to diffractive gratings (e.g., an in-coupling grating) positioned closer to where light (e.g., image beam 110) enters the waveguide.

In the examples of FIGS. 9A-9B, image source 913 transmits image beam 930 into optical element 920 at in-coupling grating 922. In-coupling grating 922 diffracts the image beam along optical element 920 through total internal reflection towards expansion grating 924. Expansion grating 924 comprises a grating configured to expand an incoming beam in the plane of the waveguide. Expansion grating 924 may also be configured to redirect the image beam to another direction. For example, in FIG. 9A, expansion grating 924 redirects the incoming beam from the x-direction to the y-direction towards out-coupling grating 926. Out-coupling grating 926 is configured to diffract the expanded beam towards an eye of a wearer of an HMD, such as HMD 1300 of FIG. 13. In some embodiments out-coupling grating 926 is further configured to expand the image beam, such as in a direction perpendicular to the direction expanded by the expansion grating. Thus, if expansion grating 924 expands the image beam in the x-direction, out-coupling grating 926 may be configured to expand the image beam in the y-direction, wherein the z-direction is perpendicular to the optical element in a direction of the user's eye.

Figure 9D:
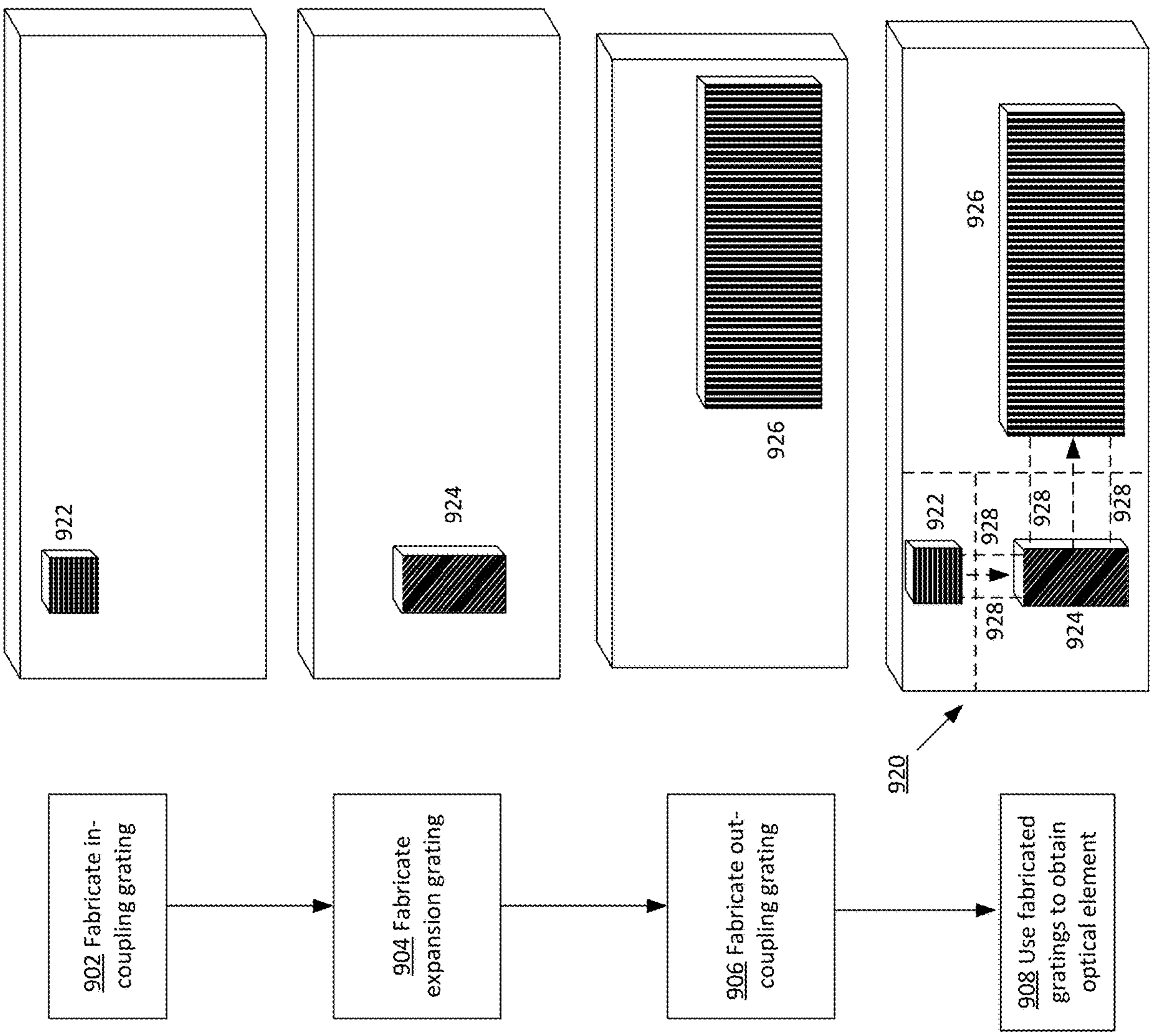
FIG. 9D depicts an example of fabricating a plurality of diffraction gratings of an optical element of an HMD or other suitable optical equipment.

FIG. 9D depicts an example of fabricating a plurality of diffraction gratings of an optical element of an HMD or other suitable optical equipment. At 902, in-coupling grating 922 may be fabricated, e.g., using any of the suitable techniques discussed in connection with FIGS. 2-8. At 904, expansion grating 924 may be fabricated, e.g., using any of the suitable techniques discussed in connection with FIGS. 2-8. At 906, out-coupling grating 926 (or grating 927 or grating 929) may be fabricated, e.g., using any of the suitable techniques discussed in connection with FIGS. 2-8. In some embodiments, each of in-coupling grating 922, expansion grating 924 and out-coupling grating 926 (or grating 927 or grating 929) may have the same number of diffractive gratings, the same types of diffractive gratings, different numbers of diffractive gratings, different types of diffractive gratings, or any suitable combination thereof.

At 908, in-coupling grating 922, expansion grating 924 and out-coupling grating 926 (or grating 927 or grating 929), having been fabricated at 902, 904 and 906, respectively, may be used to obtain optical element 920. In some embodiments, in-coupling grating 922, expansion grating 924 and out-coupling grating 926 (or grating 927 or grating 929) may be bonded 928 together in optical element 920 using glue, adhesive and/or using any other suitable technique.

Figure 10:
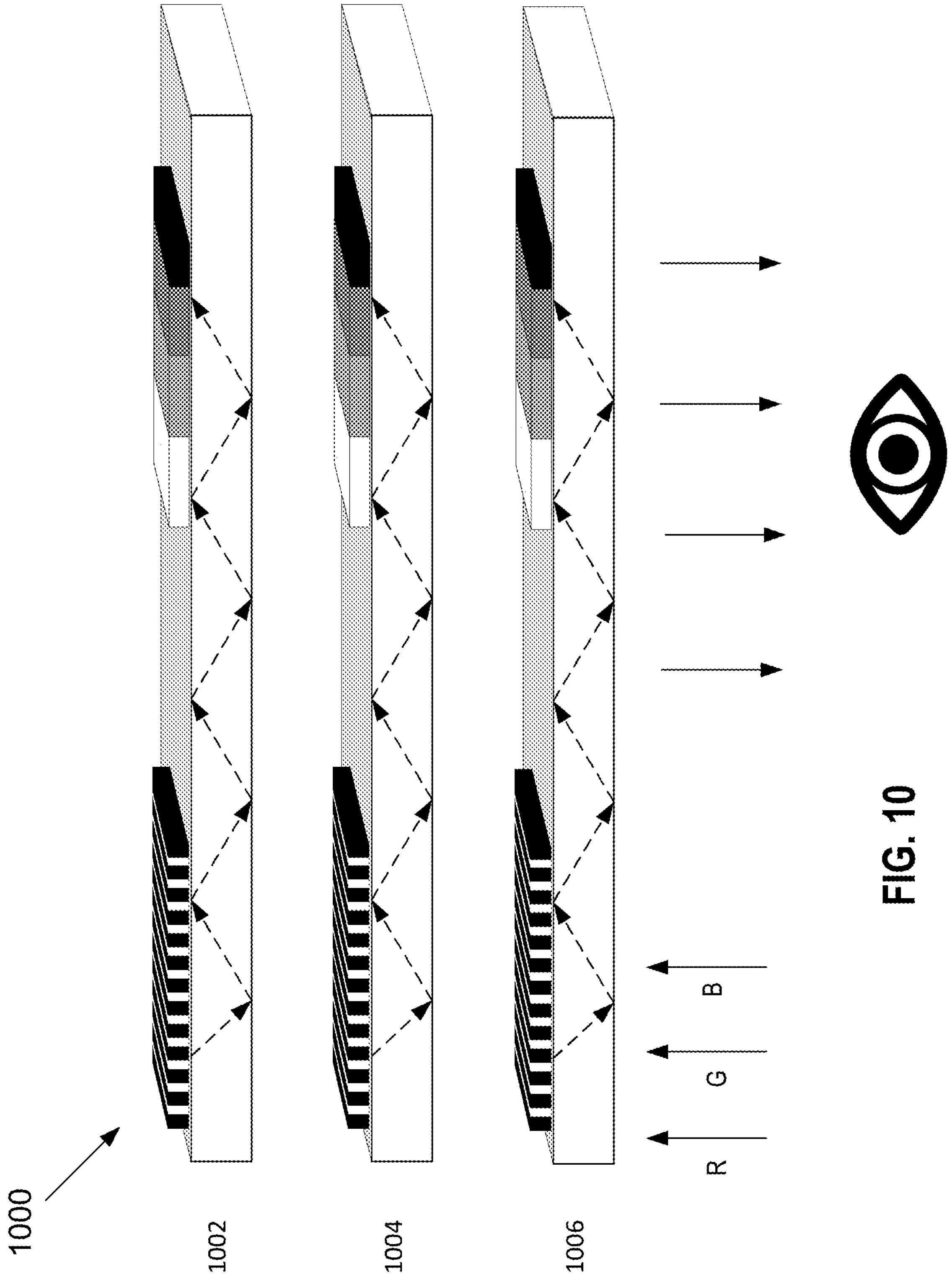
FIG. 10 depicts an example of a plurality of waveguides for use in an HMD or other suitable optical equipment.

FIG. 10 depicts an example of a plurality of waveguides for use in an HMD or other suitable optical equipment. While FIG. 10 depicts three stacked optical elements for the purpose of providing a clear example, other embodiments may include fewer or more stacked optical elements. Additionally, while FIG. 10 depicts optical elements for different wavelengths, the combination of optical elements described herein may be used with other types of optical elements, such as optical elements for different focal points. The combination of waveguides described with respect to FIG. 10 may additionally be combined with other embodiments, including additional lenses, such as the ophthalmic lenses of FIG. 11, or other types of coatings, such as anti-reflective coatings.

Optical element combination 1000 comprises three optical elements 1002, 1004, and 1006. In some embodiments, optical elements 1002, 1004, and 1006 may be separated from each other using an air spacing, or by using an angular-sensitive layer coating between neighboring elements. Each of optical elements 1002, 1004, and 1006 may comprise diffractive gratings as described herein. While the diffractive gratings in FIG. 10 are depicted as being equivalent, other embodiments may include buried diffractive gratings with different structures, of different sizes, at different angles, at different positions, at different depths, and/or with different spacings, or any other suitable characteristic may be varied across one or more gratings. Each of optical elements 1002, 1004, and 1006 may be configured to diffract image beams of different wavelengths. For example, optical element 1002 may comprise a waveguide configured to diffract an image beam with a wavelength of 465 nm; optical element 1004 may comprise a waveguide configured to diffract an image beam with a wavelength of 530 nm; and optical element 1006 may comprise, or otherwise correspond to, a waveguide configured to diffract an image beam with a wavelength of 630 nm. Thus, an HMD or other suitable optical equipment may provide each image beam to a different waveguide, thereby providing a full color image to an eye of a viewer.

Figure 11:
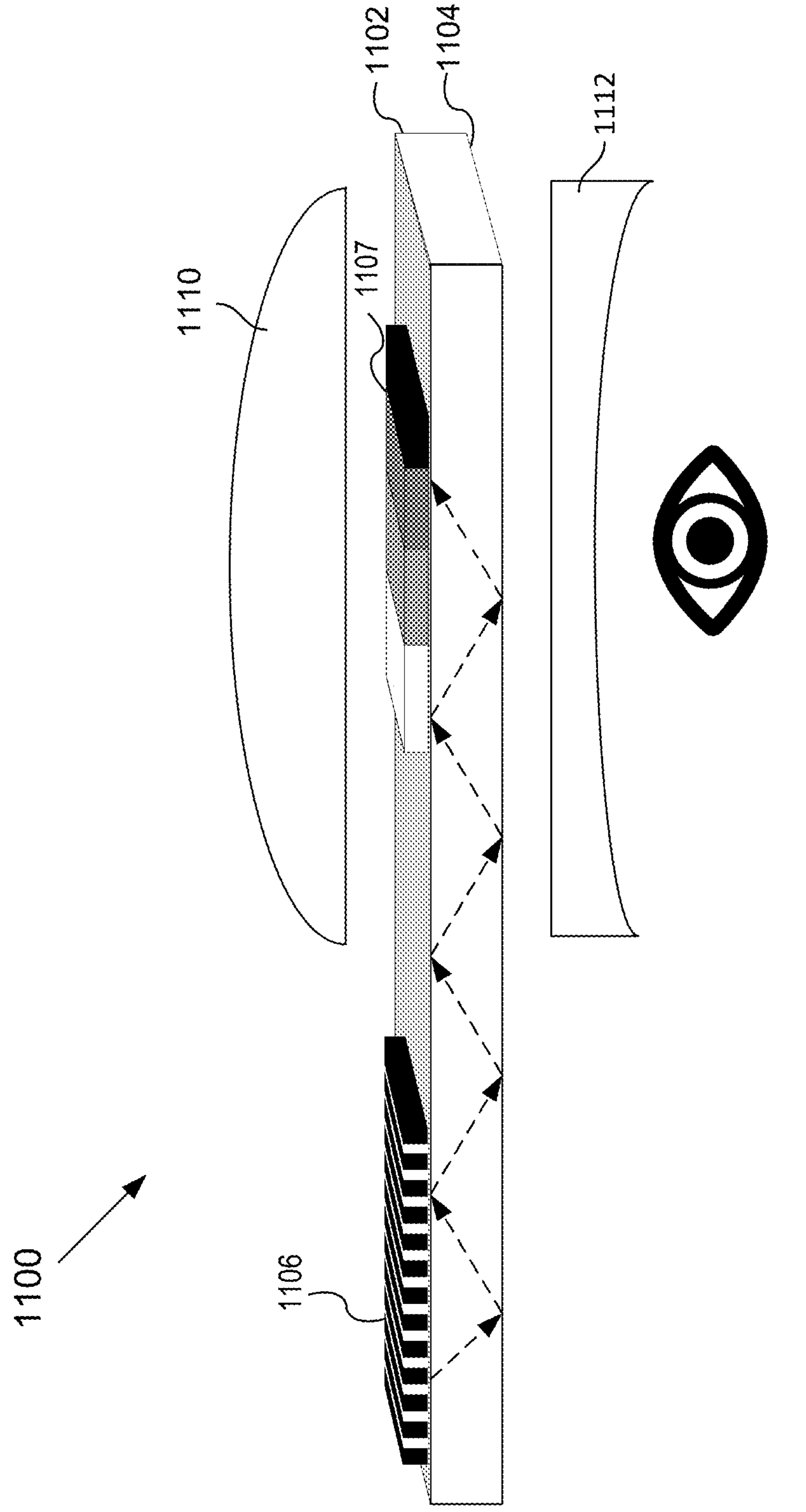
FIG. 11 depicts an optical element comprising one or more diffractive gratings and other optical elements attached thereto.

FIG. 11 depicts an optical element comprising one or more diffractive gratings and other optical elements attached thereto. Optical element 1100 comprises diffractive grating 1106 and 1107, surface 1102, and surface 1104. Surface 1102 and surface 1104 may comprise substantially flat surfaces that are substantially parallel to each other. Surface 1102 and surface 1104 may comprise a same material, such as glass or plastic, or different materials, such as glass with a high-refractive index coating that has a refractive index substantially equal to that of the glass. In some embodiments, each of surface 1102 and surface 1104 may be coated with an angular-sensitive coating to provide respective layers acting as a pseudo-air layers, which may enable the waveguide to continue to operate as if surface 1102 and surface 1104 were surrounded with a substance with a low refractive index, such as air or gas.

Convex lens 1110 and concave lens 1112 comprise two examples of ophthalmic lenses that may be used in conjunction with optical element 1100. In some embodiments, convex lens 1110 and concave lens 1112 may be separated from surfaces 1102 and 1104, respectively, using air spacings. In some embodiments, convex lens 1110 and concave lens 1112 may be attached to the flat surface of optical element 1100 on the pseudo-air layers made up of the angular-sensitive coating. Convex lens 1110 comprises a lens with a rounded surface and a flat surface that may be separated from surface 1102 by an air spacing or a pseudo-air layer. Similarly, concave lens 1112 comprises a lens with a rounded surface and a flat surface that is separated from surface 1104 by an air spacing or a pseudo-air layer. Other embodiments may include a single optical element attached to optical element 1100 and separated by an air spacing or a pseudo-air layer. Additionally, embodiments may include different types of optical elements attached to optical element 1100 and separated by an air spacing or a pseudo-air layer, such as photochromic or electrochromic lenses, actively operated lenses, polarized lenses, or other lenses.

In some embodiments, an air spacing or an angular-sensitive coating is used to separate waveguides comprising one or more diffractive gratings. The use of the buried diffractive gratings in the diffractive gratings enables the waveguides to be stacked on top of each other, thereby creating a compact set of waveguides which can be used to provide a plurality of images, such as images at different focal points or images at different frequencies.

In some embodiments, an additional coating may be used to coat surface 1102 or 1104 after fabrication of the buried diffractive grating and/or is coated on top of an angular-sensitive reflective coating that is coated on top of the surface. Such additional coating may comprise a wax or polish; an anti-reflective coating, such as magnesium fluoride; a high-reflection coating, such as a combination of zinc sulfide or titanium dioxide with magnesium fluoride or silicon dioxide; a transparent conductive coating, such as indium tin oxide; or any other coating material. In some embodiments, the coating is used to provide a pseudo-air layer between different types of lenses. In some embodiments, a coating is used to provide an optical isolation of the waveguide and other appended optical elements, such as lenses. The coating may comprise an angular-sensitive reflective coating that maintains operation of the waveguide at the angles at which light is expected to strike the surface based on the diffractive gratings. The angular-sensitive layer effectively isolates the waveguide operation at the relevant angles, allowing other optical elements to be attached to the surface over the coating. Examples of additional optical elements include ophthalmic lenses, photochromic or electrochromic lenses, dynamic or active operated lenses, polarized lenses, or other lenses. In some embodiments, the angular-sensitive reflective coating is used in conjunction with the additional coatings described above, such that the pseudo-air layer is placed between the optical element and the additional coating.

Figure 12:
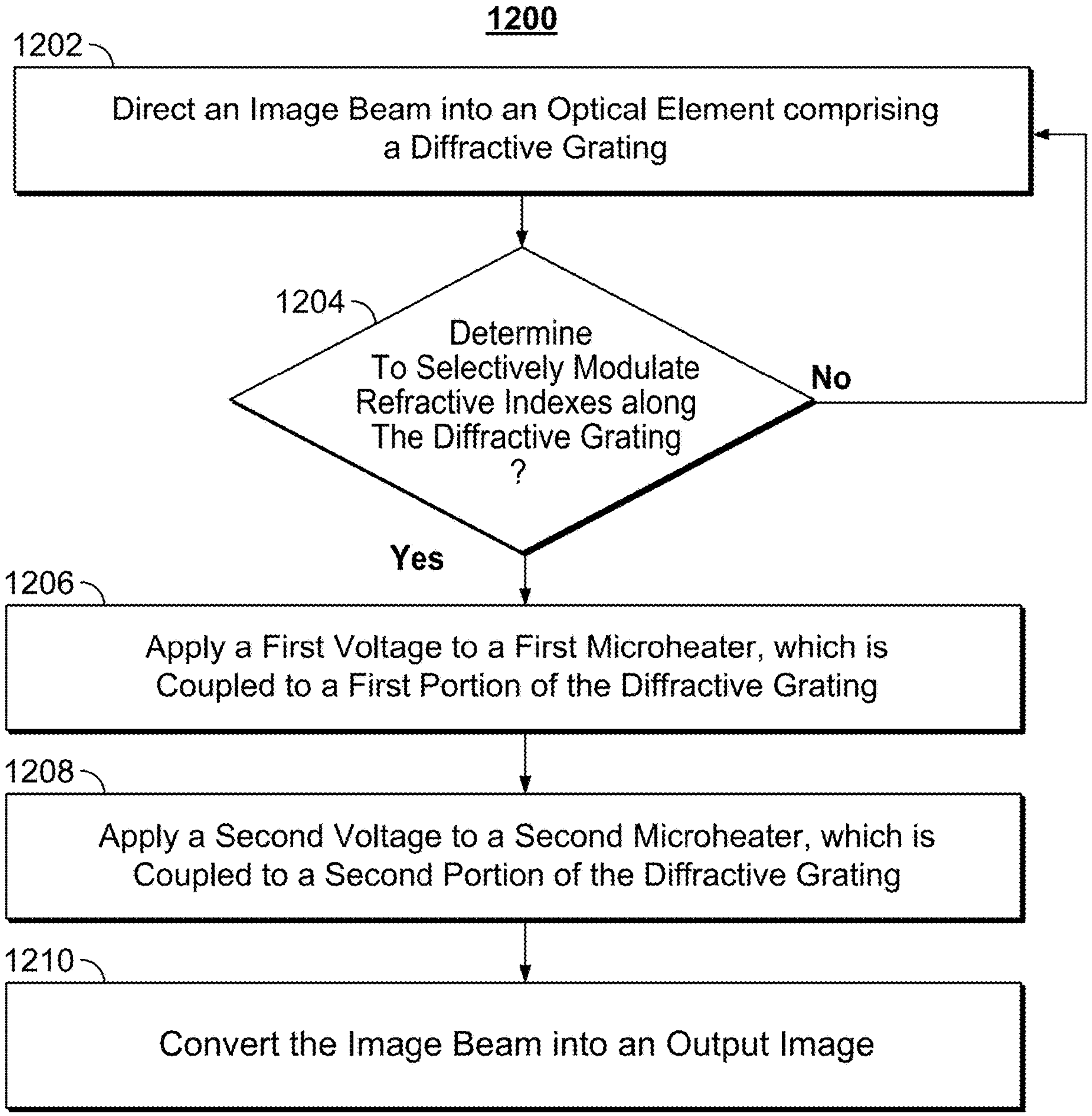
FIG. 12 depicts an illustrative flowchart for selectively modulating refractive indexes along a diffractive grating.

FIG. 12 depicts an illustrative flowchart for selectively modulating refractive indexes along a diffractive grating, in accordance with some embodiments of this disclosure. In some embodiments, control circuitry (e.g., control circuitry 1308 of FIG. 13) may cause an optical element (e.g., optical element 1302 of FIG. 13) to perform the steps of FIG. 12. In some embodiments, the steps of FIG. 12 may be performed in combination with or using any of the structures or processes described herein.

At 1202, an image beam (e.g., image beam 110 of FIG. 1A) may be directed into an optical element (e.g., optical element 100 of FIG. 1A) comprising a diffractive grating (e.g., diffractive grating 107 of FIG. 1A). Alternatively, diffractive grating 109 of optical element 101 may correspond to the diffractive grating employed in connection with FIG. 12.

At 1204, the control circuitry may determine whether to selectively modulate refractive indexes along the diffractive grating (e.g., diffractive grating 107 of FIG. 1A). In some embodiments, the determination at 1204 may be based at least in part on determining a temperature of one or more portions of diffractive grating 107, and may comparing such temperatures to a threshold temperature for a particular portion of diffractive grating. For example, it may be desirable to selectively modulate one or more portions of the diffractive grating in order to increase a temperature of a particular portion of the diffractive grating. In some embodiments, the determination at 1204 may be based at least in part on environmental conditions and/or user preferences. For example, a desired temperature for one or more portions of diffractive grating 107 may be based on an ambient temperature of an environment that the optical element (e.g., optical element 1302) is in, and/or based on user preferences indicated in a user profile. An affirmative determination at 1204 may cause processing to proceed to 1206; otherwise processing may return to 1204.

At 1206, the control circuitry may selectively modulating refractive indexes along the diffractive grating by applying a first voltage to a first microheater, which is coupled to a first portion of the diffractive grating. For example, the first portion may correspond to a portion of diffractive grating 107 nearest to diffractive grating 106 along the length of optical element 100, or any other suitable portion of diffractive grating 107. In some embodiments, the first voltage that is applied (and a time period for which the first voltage is applied) may be based on one or more of the factors discussed at 1204, e.g., a current temperature of other attribute of the first portion, and/or environmental conditions and/or user preferences. In some embodiments, the first microheater may be included in the first portion of the diffractive grating, another portion of the diffractive grating, or at another portion of the optical element, or may be otherwise distinct from the first portion of the diffractive grating.

At 1208, the control circuitry may selectively modulating refractive indexes along the diffractive grating by applying a second voltage to a second microheater, which is coupled to a second portion of the diffractive grating. For example, the second portion may correspond to a portion of diffractive grating 107 farthest from diffractive grating 106 along the length of optical element 100, or any other suitable portion of diffractive grating 107. In some embodiments, the second voltage that is applied (and a time period for which the second voltage is applied) may be based on one or more of the factors discussed at 1204, e.g., a current temperature of other attribute of the first portion, and/or environmental conditions and/or user preferences. In some embodiments, the second voltage may exceed the first voltage, which may be desirable to obtain a larger refractive index at a portion further along the length of the diffractive grating. In some embodiments, the second microheater may be included in the second portion of the diffractive grating, another portion of the diffractive grating, or at another portion of the optical element, or may be otherwise distinct from the second portion of the diffractive grating. For example, the At 1210, the control circuitry may convert the image beam into an output image. For example, the image beam may be converted into the output image by diffracting the image beam through the diffractive grating while selectively modulating the refractive indexes along the diffractive grating, and directing the image beam through a surface (e.g., surface 102 of FIG. 1A) of the optical element (e.g., optical element 100 of FIG. 1A).

Figure 13:
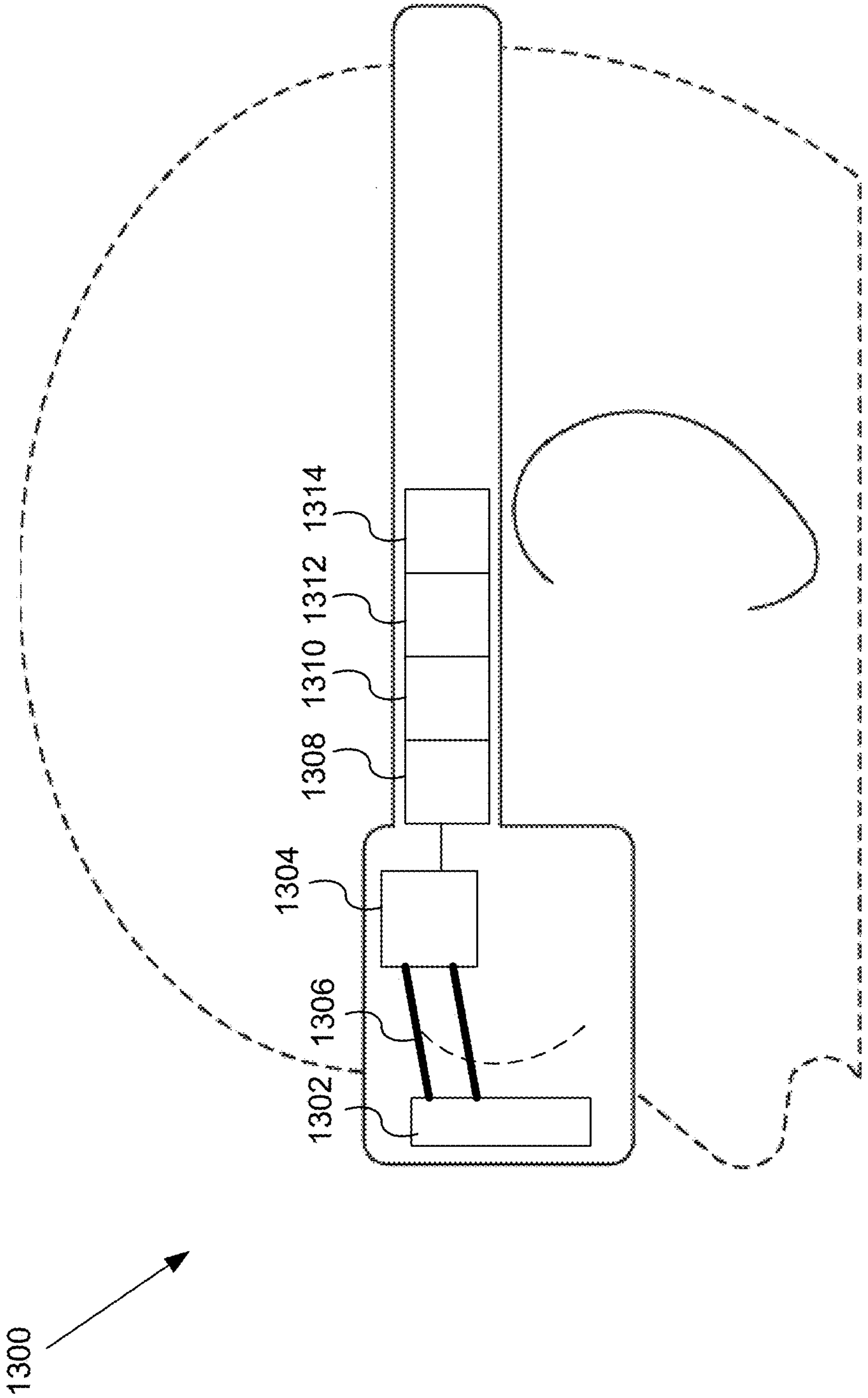
FIG. 13 depicts an example of an HMD comprising one or more optical elements with a diffractive grating.

FIG. 13 depicts an example of an HMD comprising one or more optical elements with a diffractive grating. In some embodiments, an HMD may correspond to optical equipment. HMD 1300 comprises optical element 1302, image source 1304, control circuitry 1308, memory 1310, network adaptor 1312, and power source 1314. HMD may comprise any suitable type of voltage source and any suitable number of voltage sources, which may correspond to voltage source 112 of FIG. 1A. Optical element 1302 comprises an optical element, such as a lens, which sits in front of an eye of a user. Image source 1304 provides an image beam 1306 to the optical element, which is diffracted by a buried diffractive grating and displayed to the eye of the user. Control circuitry 1308 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., quad-core). Control circuitry 1308 may be configured to generate one or more images for display through the HMD and instruct image source 1304 to produce one or more image beams corresponding to the one or more images. Memory 1310 may be any device for storing electronic data, such as a random-access memory, a solid-state device, a quantum storage device, a hard disk drive, a non-volatile memory or any other suitable fixed or removable storage device, and/or any combination of the same. Memory 1310 may store data defining images for display by the HMD. Network adaptor 1312 comprises circuitry that connects the HMD to one or more other devices over a network. Network adaptor 1312 may comprise wires and/or busses connected to a physical network port, e.g. an ethernet port, a wireless Wi-Fi port, a cellular communication port, or any other type of suitable physical port. Power source 1314 comprises a source of power to the image source 1304, control circuitry 1308, memory 1310, and/or network adaptor 1312, such as a battery, solar generator, or wired power source.

What is claimed is:

1. A head-mounted display, comprising:

an image source configured to provide an image beam;

an optical element comprising a diffractive grating;

a first microheater corresponding to a first portion of the diffractive grating, wherein a first voltage source is electrically coupled to the first microheater to apply a first voltage to the first microheater to selectively modulate a first refractive index of the first portion of the diffractive grating; and a second microheater corresponding to a second portion of the diffractive grating, wherein the second portion of the diffractive grating is distinct from the first portion of the diffractive grating, wherein a second voltage source is electrically coupled to the second microheater to apply a second voltage to the second microheater to selectively modulate a second refractive index of the second portion of the diffractive grating;

wherein the optical element is configured to convert the image beam into an output image by:

receiving the image beam at an incoupling grating of the optical element, which diffracts the image beam towards an expansion grating of the optical element;

expanding the image beam by the expansion grating of the optical element, and transmitting the image beam from the expansion grating to an outcoupling grating; and diffracting the expanded image beam by the outcoupling grating towards an eyeball of a wearer of the head-mounted display.

2. The head-mounted display of claim 1, wherein each of the first microheater and the second microheater comprise a transparent conductive material.

3. The head-mounted display of claim 2, wherein the transparent conductive material comprises indium tin oxide.

4. The head-mounted display of claim 1, wherein the diffractive grating comprises each of the first microheater and the second microheater.

5. The head-mounted display of claim 1, wherein each of the first microheater and the second microheater is embedded in the diffractive grating.

6. The head-mounted display of claim 1, wherein the first portion of the diffractive grating is embedded at a first position along a length of the optical element and the second portion of the diffractive grating is embedded at a second position along the length of the optical element.

7. The head-mounted display of claim 1, wherein the first portion of the diffractive grating is embedded at a first depth in the optical element and the second portion of the diffractive grating is embedded at a second depth in the optical element.

8. The head-mounted display of claim 1, wherein the diffractive grating is a surface relief grating or a buried diffractive grating.

9. The head-mounted display of claim 1, wherein the diffractive grating is a surface relief grating, and the optical element further comprises a buried diffractive grating.

10. The head-mounted display of claim 1, wherein:

the second voltage exceeds the first voltage; and wherein the optical element is configured to selectively modulate the first portion of the diffractive grating and the second portion of the diffractive grating by:

causing, based on applying the first voltage and the second voltage, a temperature of the second portion to be higher than a temperature of the first portion.

11. The head-mounted display of claim 10, wherein;

each of the first portion and the second portion is included in the outcoupling grating.

12. The head-mounted display of claim 1, wherein the optical element is configured to selectively modulate the first refractive index and the second refractive index based at least in part on user preferences indicated in a profile of a user associated with the head-mounted display.

13. The head-mounted display of claim 1, further comprising control circuitry configured to:

determine a first temperature of the first portion of the diffractive grating;

determine a second temperature of the second portion of the diffractive grating;

compare the first temperature to a threshold temperature;

compare the second temperature to the threshold temperature;

based at least in part on the comparing of the first temperature to the threshold temperature, causing the first voltage source to apply the first voltage to the first portion of the diffractive grating; and based at least in part on the comparing of the second temperature to the threshold temperature, causing the second voltage source to apply the second voltage to the second portion of the diffractive grating.

14. The head-mounted display of claim 1, wherein the diffractive grating comprises the incoupling grating.

15. The head-mounted display of claim 1, wherein the diffractive grating comprises the expansion grating.

16. The head-mounted display of claim 1, wherein the diffractive grating comprises the outcoupling grating.

17. A method comprising:

directing an image beam into an optical element, the optical element comprising a first diffractive grating and a second diffractive grating;

wherein a first microheater corresponds to a first portion of the first diffractive grating, wherein a first voltage source is electrically coupled to the first microheater;

wherein a second microheater corresponds to a second portion of the first diffractive grating, wherein the second portion of the first diffractive grating is distinct from the first portion of the first diffractive grating, wherein a second voltage source is electrically coupled to the second microheater;

selectively modulating a first refractive index of the first portion of the first diffractive grating and a second refractive index of the second portion of the first diffractive grating by:

applying, by way of the first voltage source, a first voltage to the first microheater, which is coupled to the first portion of the first diffractive grating, to selectively modulate the first refractive index of the first portion of the first diffractive grating; and applying, by way of the second voltage source, a second voltage to the second microheater, which is coupled to the second portion of the first diffractive grating, to selectively modulate the second refractive index of the second portion of the first diffractive grating, wherein the method further comprises causing the second voltage applied to the second portion of the first diffractive grating to exceed the first voltage applied to the first portion of the first diffractive grating based at least in part on determining that the second portion of the first diffractive grating is further from the second diffractive grating along a length of the optical element than the first portion of the first diffractive grating; and causing, based on applying the first voltage and the second voltage, a temperature of the second portion of the first diffractive grating to be higher than a temperature of the first portion of the first diffractive grating; and converting the image beam into an output image by diffracting the image beam through the first diffractive grating while selectively modulating the first refractive index and the second refractive index along the first diffractive grating, and directing the image beam through a surface of the optical element.

18. The method of claim 17, wherein the first diffractive grating comprises each of the first microheater and the second microheater.

19. The method of claim 17, wherein the first and second voltages, and time periods for applying the first and second voltages, for selectively modulating the first refractive index and the second refractive index are based at least in part on user preferences indicated in a profile associated with a user of a head-mounted display comprising the optical element.

20. The method of claim 17, wherein the first and second voltages, and time periods for applying the first and second voltages, for selectively modulating the first refractive index and the second refractive index is based at least in part on a current ambient temperature of an environment that the optical element is in.

* * * * *